United States Patent
Cui et al.

(10) Patent No.: US 12,464,393 B2
(45) Date of Patent: Nov. 4, 2025

(54) INTRA-FREQUENCY MEASUREMENT ENHANCEMENT IN NEW RADIO HIGH SPEED TRAIN

(71) Applicant: Apple Inc., Cupertino, CA (US)

(72) Inventors: Jie Cui, San Jose, CA (US); Qiming Li, Beijing (CN); Manasa Raghavan, Sunnyvale, CA (US); Huaning Niu, San Jose, CA (US); Yang Tang, San Jose, CA (US); Dawei Zhang, Saratoga, CA (US); Hong He, San Jose, CA (US)

(73) Assignee: Apple Inc., Cupertino, CA (US)

( * ) Notice: Subject to any disclaimer, the term of this patent is extended or adjusted under 35 U.S.C. 154(b) by 713 days.

(21) Appl. No.: 17/439,598

(22) PCT Filed: Oct. 22, 2020

(86) PCT No.: PCT/CN2020/122903
§ 371 (c)(1),
(2) Date: Sep. 15, 2021

(87) PCT Pub. No.: WO2022/082633
PCT Pub. Date: Apr. 28, 2022

(65) Prior Publication Data
US 2024/0031848 A1  Jan. 25, 2024

(51) Int. Cl.
*H04W 24/10* (2009.01)
*H04L 5/00* (2006.01)
*H04W 56/00* (2009.01)
*H04W 76/30* (2018.01)

(52) U.S. Cl.
CPC ............ *H04W 24/10* (2013.01); *H04L 5/001* (2013.01); *H04W 56/001* (2013.01); *H04W 76/30* (2018.02)

(58) Field of Classification Search
None
See application file for complete search history.

(56) References Cited

U.S. PATENT DOCUMENTS

| | | | |
|---|---|---|---|
| 2015/0181450 A1* | 6/2015 | Xin | H04L 5/0048 370/252 |
| 2016/0302228 A1* | 10/2016 | Kazmi | H04L 5/0055 |
| 2016/0360537 A1* | 12/2016 | Palenius | H04W 76/27 |
| 2019/0021020 A1* | 1/2019 | Kim | H04W 52/0216 |

(Continued)

FOREIGN PATENT DOCUMENTS

| | | |
|---|---|---|
| CN | 105578542 A | 5/2016 |
| CN | 110062392 A | 7/2019 |

(Continued)

OTHER PUBLICATIONS

ETSI TS 138 533 V16.4.0, 5G; NR; User Equipment (UE) conformance specification; Radio Resource Management (RRM) (3GPP TS 38.533 version 16.4.0 Release 16), Sep. 2020, 1314 pages (Year: 2020).*

(Continued)

*Primary Examiner* — Scott M Sciacca
(74) *Attorney, Agent, or Firm* — Kilpatrick Townsend & Stockton LLP

(57) ABSTRACT

The present application relates to devices and components including apparatus, systems, and methods to provide intra-frequency measurement enhancement in new radio high speed train.

20 Claims, 12 Drawing Sheets

(56) References Cited

U.S. PATENT DOCUMENTS

2019/0274146 A1    9/2019   Tang et al.
2019/0306734 A1*  10/2019   Huang .................. H04W 24/08

FOREIGN PATENT DOCUMENTS

| CN | 110557976 A   | 12/2019 |
| CN | 111065119 A   | 4/2020  |
| CN | 112567775 A   | 3/2021  |
| WO | 2020041125 A1 | 2/2020  |
| WO | 2020088597 A1 | 5/2020  |
| WO | 2020172651 A1 | 8/2020  |

OTHER PUBLICATIONS

ETSI TS 138 133 V16.6.0, 5G; NR; Requirements for support of radio resource management (3GPP TS 38.133 version 16.6.0 Release 16), Feb. 2021, 1847 pages.

ETSI TS 138 306 V16.3.0, 5G; NR; User Equipment (UE) radio access capabilities (3GPP TS 38.306 version 16.3.0 Release 16), Jan. 2021, 134 pages.

ETSI TS 138 331 V16.3.1, 5G; NR; Radio Resource Control (RRC); Protocol specification (3GPP TS 38.331version16.3.1Release16), Jan. 2021, 916 pages.

Measurement Requirements for Deactivated SCells in FR2, Ericsson, 3GPP TSG-RAN WG4 Meeting #AH1807, R4-1808709, Jul. 2-6, 2018, 3 pages.

International Patent Application No. PCT/CN2021/085250, International Search Report and Written Opinion, Nov. 17, 2021, 10 pages.

The International Application No. PCT/CN2020/122903, "International Preliminary Report on Patentability," mailed May 4, 2023, 6 pages.

3rd Generation Partnership Project; Technical Specification Group Radio Access Network; NR; Requirements for support of radio resource management (Release 16), 3GPP TS 38.133 V16.5.0, Sep. 2020, 1608 pages.

Discussion on LTE high speed in Rel. 16, Huawei, HiSilicon,3GPP TSG-RAN WG4 Meeting #90, R4-1901239, Mar. 2019, 4 pages.

International Application No. PCT/CN2020/122903, International Search Report and Written Opinion, Jul. 9, 2021, 9 pages.

"CR on Introducing Inter-frequency Measurements Without Measurement Gap (9.1.5, 9.1.6, 9.3.1, 9.3.4, 9.3.5)", 3rd Generation Partnership Project Technical Specification Group Radio Access Network Working Group 4, Meeting # 95-e, R4-2006807, May 25-Jun. 5, 2020, 17 pages.

"Title Requirements for RRC Connected Mode Mobility in High Speed NR", R4-2003101, 3rd Generation Partnership Project Technical Specification Group Radio Access Network Working Group4 Meeting #94bis-e , Apr. 20-30, 2020 , 8 pages.

The Chinese Application No. CN202080106549.2, "Office Action", mailed Jul. 25, 2024, 14 pages.

The European Application No. EP20958215.4, "Extended European Search Report", mailed Sep. 11, 2024, 12 pages.

The European Application No. EP20958215.4, "Partial Supplementary European Search Report", mailed Jun. 18, 2024, 13 pages.

China Patent Application No. 202080106549.2, Notice of Decision to Grant, Feb. 24, 2025, 4 pages.

* cited by examiner

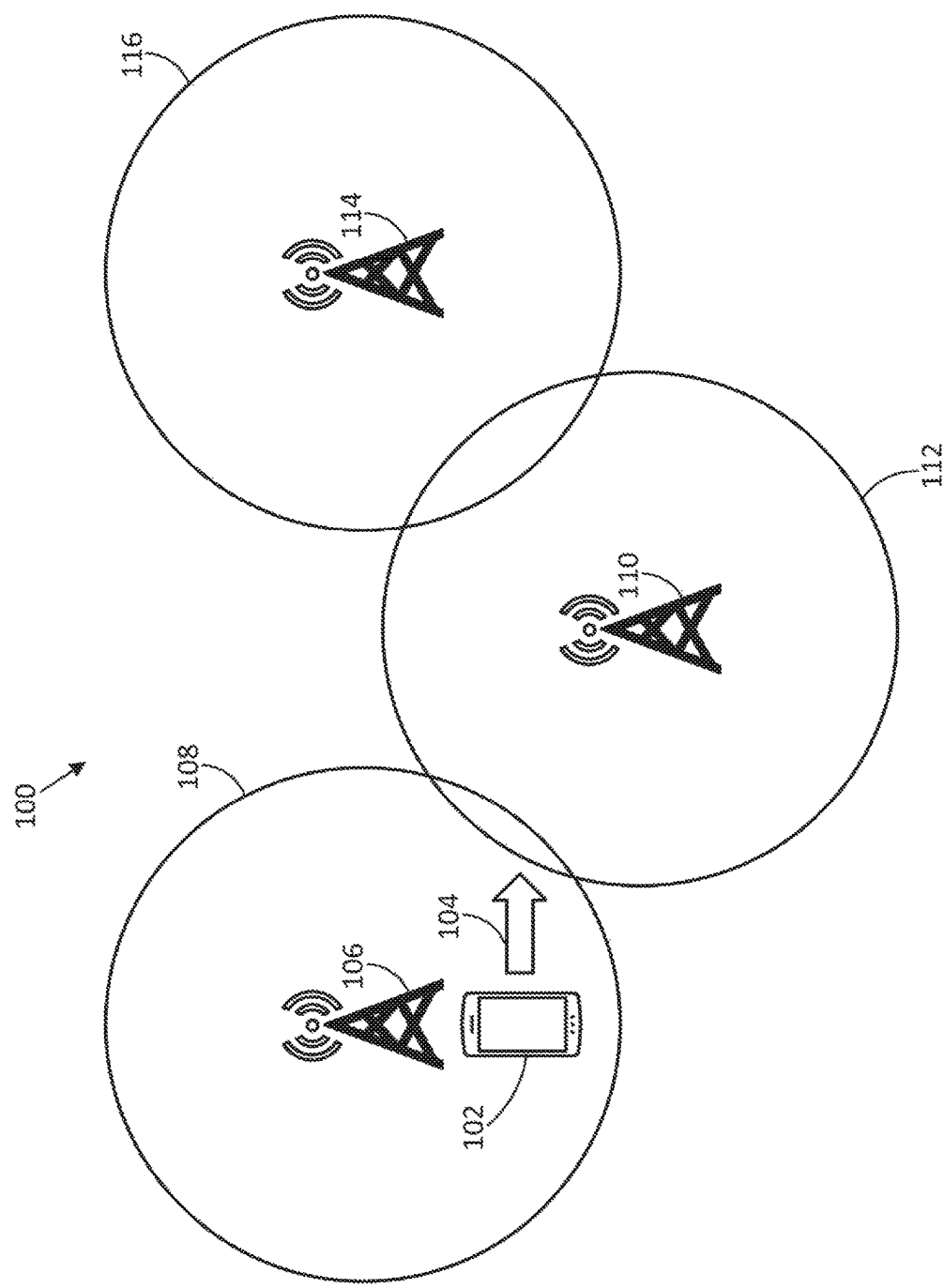

Figure 2

| DRX cycle | $T_{SSB\_measurement\_period\_intra}$ |
|---|---|
| No DRX | $\max(200ms, 5 \times \max(MGRP, SMTC\ period))$ [Note 1] |
| DRX cycle ≤ 160ms | $\max(200ms, ceil(M2^{Note\ 2} \times 5) \times \max(MGRP, SMTC\ period, DRX\ cycle))$ |
| 160ms < DRX cycle ≤ 320ms | $\max(200ms, ceil(M2^{Note\ 2} \times 4) \times \max(MGRP, DRX\ cycle))$ |
| DRX cycle>320ms | $Y^{Note\ 3} \times \max(MGRP, DRX\ cycle)$ |

NOTE 1: If different SMTC periodicities are configured for different cells, the SMTC period in the requirement is the one used by the cell being identified
NOTE 2: M2 = 1.5 if SMTC periodicity > 40 ms, otherwise M2=1
NOTE 3: Y=3 when SMTC <= 40ms, Y=5 when SMTC > 40ms

Figure 3

| DRX cycle | $T_{SSB\_measurement\_period\_intra}$ |
|---|---|
| No DRX [Note 2] | $\max(200ms, 5 \times K_p) \times SMTC\ period)$ [Note 1] |
| DRX cycle ≤ 160ms | $\max(200ms, ceil(5 \times M2^{Note\ 2} \times K_p) \times \max(MGRP, SMTC\ period, DRX\ cycle))$ |
| 160ms < DRX cycle ≤ 320ms | $ceil(4 \times M2^{Note\ 2} \times K_p) \times \max(SMTC\ period, DRX\ cycle)$ |
| DRX cycle>320ms | $ceil(Y^{Note\ 3} \times K_p) \times DRX\ cycle$ |

NOTE 1: If different SMTC periodicities are configured for different cells, the SMTC period in the requirement is the one used by the cell being identified
NOTE 2: M2 = 1.5 if SMTC periodicity > 40 ms, otherwise M2=1
NOTE 3: Y=3 when SMTC <= 40ms, Y=5 when SMTC > 40ms

| DRX cycle | $T_{SSB\_measurement\_period\_intra}$ |
|---|---|
| No DRX | $\max(200\text{ms}, 5 \times \max(\text{MGRP, SMTC period}))_{Note\,1} \times \text{CSSF}_{intra}$ |
| DRX cycles 160ms | $\max(200\text{ms}, \text{ceil}(M2^{Note\,2} \times 5) \times \max(\text{MGRP, SMTC period, DRX cycle})) \times \text{CSSF}_{intra}$ |
| 160ms < DRX cycles 320ms | $\max(200\text{ms}, \text{ceil}(M2^{Note\,2} \times 4) \times \max(\text{MGRP, DRX cycle})) \times \text{CSSF}_{intra}$ |
| DRX cycle>320ms | $Y^{Note\,3} \times \max(\text{MGRP, DRX cycle}) \times \text{CSSF}_{intra}$ |

NOTE 1: If different SMTC periodicities are configured for different cells, the SMTC period in the requirement is the one used by the cell being identified
NOTE 2: M2 = 1.5 if SMTC periodicity > 40 ms, otherwise M2=1
NOTE 3: Y=3 when SMTC <= 40ms, Y=5 when SMTC > 40ms

INTRA-FREQUENCY MEASUREMENT ENHANCEMENT IN NEW RADIO HIGH SPEED TRAIN

CROSS-REFERENCES TO RELATED APPLICATIONS

This application is a U.S. National Stage Application of PCT/CN2020/122903, filed Oct. 22, 2020. The disclosure of which is herein incorporated by reference in its entirety for all purposes.

BACKGROUND

Third Generation Partnership Project (3GPP) networks provide that a user equipment may operate in a high-speed mode. The user equipment may be able to perform measurements of different component carriers in high-speed mode.

BRIEF DESCRIPTION OF THE DRAWINGS

FIG. 1 illustrates an example network environment in accordance with some embodiments.

FIG. 2 illustrates an example measurement period table in accordance with some embodiments.

FIG. 3 illustrates an example measurement period table in accordance with some embodiments.

FIG. 4 illustrates an example measurement period table in accordance with some embodiments.

DETAILED DESCRIPTION

Figure 5:
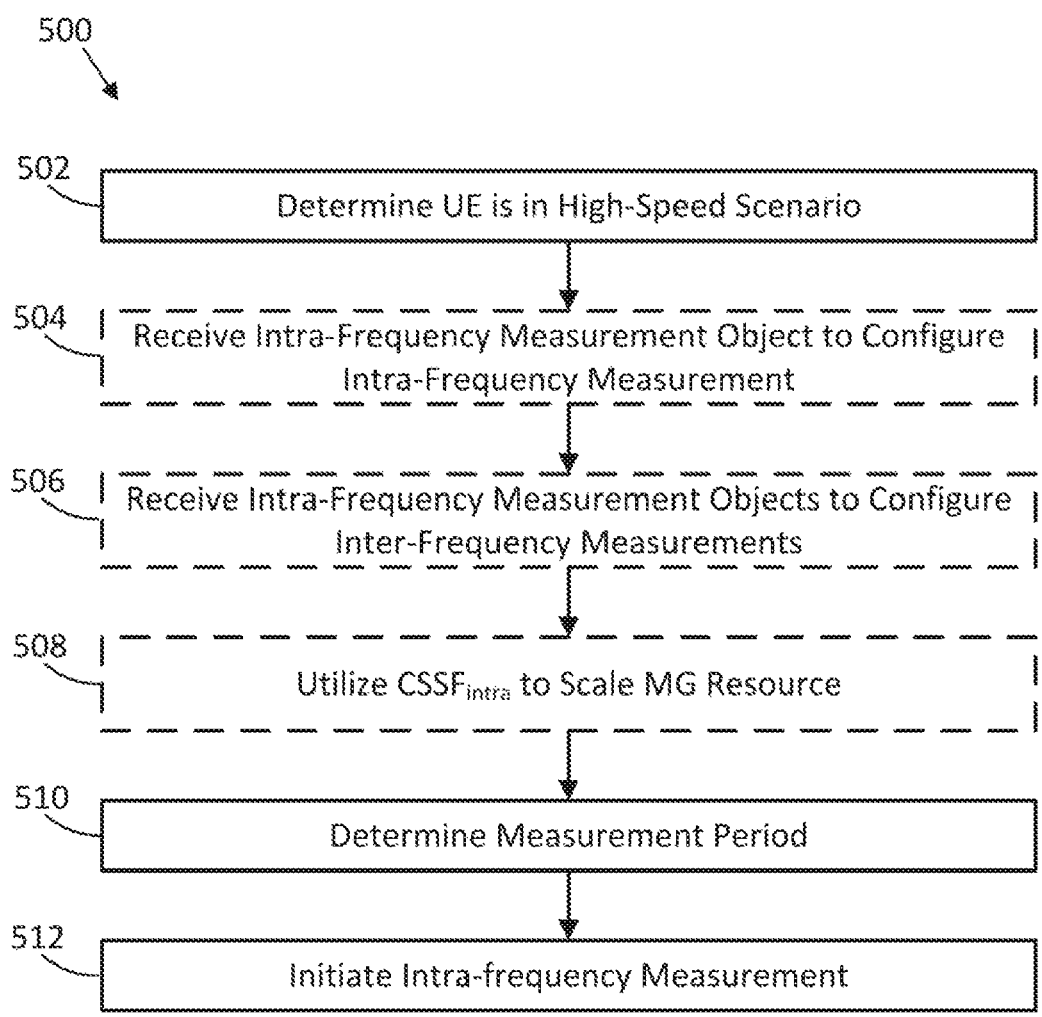
FIG. 5 illustrates an example procedure for implementing the measurement periods of FIG. 4 in accordance with some embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

The following is a glossary of terms that may be used in this disclosure.

The term "circuitry" as used herein refers to, is part of, or includes hardware components such as an electronic circuit, a logic circuit, a processor (shared, dedicated, or group) or memory (shared, dedicated, or group), an application specific integrated circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable system-on-a-chip (SoC)), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, or transferring digital data. The term "processor circuitry" may refer an application processor, baseband processor, a central processing unit (CPU), a graphics processing unit, a single-core processor, a dual-core processor, a triple-core processor, a quad-core processor, or any other device capable of executing or otherwise operating computer-executable instructions, such as program code, software modules, or functional processes.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "computer system" as used herein refers to any type interconnected electronic devices, computer devices, or components thereof. Additionally, the term "computer system" or "system" may refer to various components of a computer that are communicatively coupled with one another. Furthermore, the term "computer system" or "system" may refer to multiple computer devices or multiple computing systems that are communicatively coupled with one another and configured to share computing or networking resources.

The term "resource" as used herein refers to a physical or virtual device, a physical or virtual component within a computing environment, or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, or the like. A "hardware resource" may refer to compute, storage, or network resources provided by physical hardware element(s). A "virtualized resource" may refer to compute, storage, or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with or equivalent to "communications channel," "data communications channel," "transmission channel," "data transmission channel," "access channel," "data access channel," "link," "data link," "carrier," "radiofrequency carrier," or any other like term denoting a pathway or medium through which data is communicated. Additionally, the term "link" as used herein refers to a connection between two devices for the purpose of transmitting and receiving information.

The terms "instantiate," "instantiation," and the like as used herein refers to the creation of an instance. An "instance" also refers to a concrete occurrence of an object, which may occur, for example, during execution of program code.

The term "connected" may mean that two or more elements, at a common communication protocol layer, have an established signaling relationship with one another over a communication channel, link, interface, or reference point.

The term "network element" as used herein refers to physical or virtualized equipment or infrastructure used to provide wired or wireless communication network services. The term "network element" may be considered synonymous to or referred to as a networked computer, networking hardware, network equipment, network node, virtualized network function, or the like.

The term "information element" refers to a structural element containing one or more fields. The term "field" refers to individual contents of an information element, or a data element that contains content. An information element may include one or more additional information elements.

Figure 15:
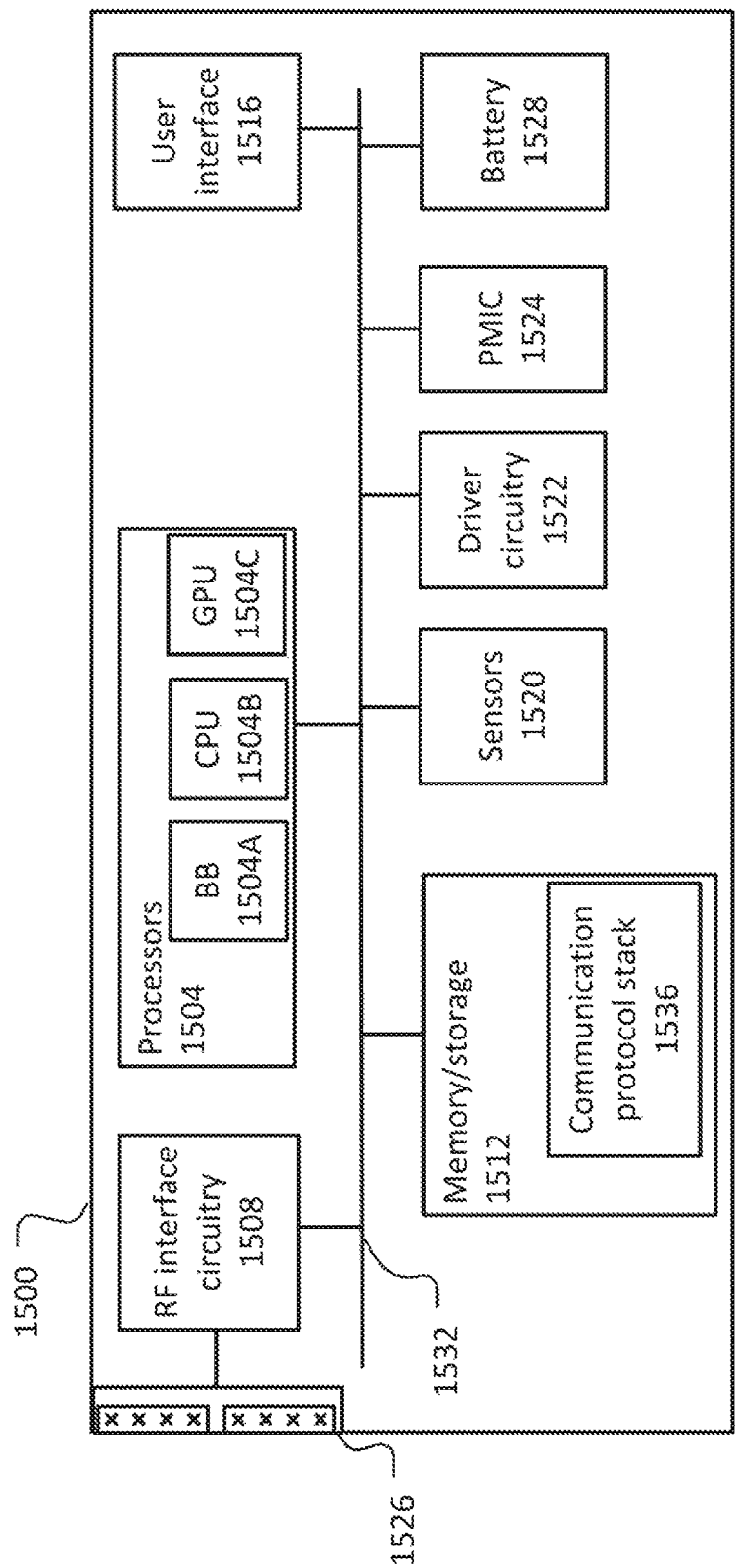
FIG. 15 illustrates an example user equipment in accordance with some embodiments.

FIG. 1 illustrates an example network environment 100 in accordance with some embodiments. In particular, the network environment 100 illustrates a user equipment (UE) 102 that may be in a high-speed scenario (which may also be referred to as a 'high speed train (HST) scenario'). The UE 102 may include one or more of the features of the UE 1500 (FIG. 15).

In high speed train scenarios, the measurement requirement is different from the legacy radio resource management (RRM) measurement since the UE mobility scenario is quite special, e.g. the moving speed could be up to 500 kilometers per hour (km/h). For example, the UE 102 may have a different measurement requirement from legacy measurement since the UE 102 is moving at high speeds (as indicated by arrow 104), such as 500 km/h. A threshold speed may be defined for high-speed mode, where a UE traveling at a speed fastest than the threshold speed may be configured for high-speed mode. In response to determining the UE 102 is traveling faster than the threshold speed, the UE 102 may be configured to operate in accordance with characteristics for the high-speed mode.

The characteristics for the high-speed mode may address issues that may be presented by the high speed of travel of the UE 102, such as improper connecting and disconnecting from cells/base stations with a radio access network (RAN) in which the UE 102 is operating. For example, the network environment 100 includes a first base station 106 with a first cell 108, a second base station 110 with a second cell 112, and a third base station 114 with a third cell 116 in the illustrated embodiment. The first base station 106, the second base station 110, and the third base station 114 may include one or more of the features of the next generation Node B (gNB) 1600 (FIG. 16) As the UE 102 travels among the cell at high speed, which of the first base station 106, the second base station 110, and the third base station 114 the UE 102 is to connect to at which time may be an issue that is not addressed by the legacy RRM measurement. If the UE 102 incorrectly determines the proper base station with which to connect, there is a risk that the UE 102 may lose service. Choosing the proper base station may be especially challenging when the base stations 106, 110, and 114 are provided by different vendors, with different radio access technologies (RATs), etc. The UE 102 may operate in the high-speed mode with the associated characteristics to address this issue. While there are three base stations and three cells illustrated in the network environment 100 for brevity, it should be understood that there may be more or less base stations and cells in other embodiments.

FIG. 2 illustrates an example measurement period table 200 in accordance with some embodiments. In particular, the table 200 may provide measurement periods when RRM enhancement for high speed is configured (frequency range 1 (FR1)). The measurement periods provided may be in accordance with measurement periods for intra-frequency measurement for legacy RANs approaches when a UE (such as the UE 102 (FIG. 1)) is operating in high-speed mode.

In the legacy approaches, some of the enhancement has been made for intra-frequency measurement, however, there are still some missing parts that could be further enhanced to improve the UE mobility and throughput performance. In the intra-frequency with measurement gap (MG) design in legacy technical specification (TS) 38.133, it was as specified in the table 200 (3GPP Organizational Partners. (2020-09) 3$^{rd}$ *Generation Partnership Project; Technical Specification Group Radio Access Network; NR; Requirements for support of radio resource management.* (3GPP TS 38.133 V16.5.0)). The table 200 is intra-frequency with measurement gap (MG), so measurement gap repetition period (MGRP). In particular, a measurement period ($T_{SSB\_measurement\_period\_intra}$) may be determined based on the MGRP, a synchronization signal/physical broadcast channel-based measurement time configuration (SMTC) period, a size of a discontinuous reception (DRX) cycle, or some combination thereof based on a size of a DRX cycle or lack of a DRX cycle.

For example, the $T_{SSB\_measurement\_period\_intra}$ for a UE with no DRX cycle may be determined by the equation max(200 ms, 5× max(MGRP, SMTC period)). If different SMTC periodicities are configured for different cells, the SMTC period in the requirement is the one used by the cell being identified. The $T_{SSB\_measurement\_period\_intra}$ for a UE with a DRX cycle less than or equal to 160 ms may be determined by the equation max(200 ms, ceil(M2×5)×max(MGRP. SMTC period, DRX cycle)), where M2 equals 1.5 if the SMTC periodicity is greater than 40 ms, otherwise M2 equals 1. The $T_{SSB\_measurement\_period\_intra}$ for a UE with a DRX cycle greater than 160 ms and less than 320 ms may be determined by the equation max(200 ms, ceil(M2×4)× max(MGRP, DRX cycle)), where M2 equals 1.5 if the SMTC periodicity is greater than 40 ms, otherwise M2 equals 1. The $T_{SSB\_measurement\_period\_intra}$ for a UE with a DRX cycle greater than 320 ms may be determined by the equation Y×max(MGRP, DRX cycle), where Y equals 3 when SMTC is less than or equal to 40 ms, or Y equals 5 when SMTC is greater than 40 ms.

For FIG. 2, the intra-frequency measurement so far did not consider any resource sharing with other measurement objects (i.e., no carrier specific scaling factor (CSSF) in the table 200). In release 16 (R16) (3GPP Organizational Partners. 3rd Generation Partnership Project; Technical Specification Group Radio Access Network. (Release 16)) high-speed train (HST), UE only support single serving CC, so only one intra-frequency measurement object (MO) would be configured to this UE but that does not mean inter-frequency MOs cannot use the measurement resource.

In R16 HST, carrier aggregation (CA) is not considered for HST UE, but from release 17 (R17) (3GPP Organizational Partners. 3rd Generation Partnership Project; Technical Specification Group Radio Access Network. (Release 17)) the periods in the table 200 may need to be enhanced for the UE measurement for FR1 CA case. In order to accommodate for CA scenarios, cell identification procedure on deactivated secondary component carrier (SCC) in FR1 CA, synchronization signal/physical broadcast channel block (SSB) index reading procedure on deactivated SCC in FR1 CA, and/or measurement procedure on deactivated SCC in FR1 CA may be considered for the period. For the cell identification procedure on deactivated SCC in FR1 CA, a sample number on deactivated SCC for certain measCycleSCell may be considered. For the SSB index reading procedure on deactivated SCC in FR1 CA, a sample number on deactivated SCC for certain measCycleSCell may be considered. For the measurement procedure on deactivated SCC in FR1 CA, how to use high speed flag and measCycleSCell and/or the sample number on deactivated SCC for certain measCycleSCell may be considered.

While SSB has been defined as synchronization signal/physical broadcast channel block, it should be understood that SSB may be referred to simply as synchronization signal block in some instances. As the synchronization signal and the physical broadcast channel are packed in a single block, the synchronization signal block and synchronization signal physical broadcast channel block may refer to a same block. Accordingly, synchronization signal/physical broadcast channel block and synchronization signal block may be used interchangeably.

FIG. 3 illustrates an example measurement period table 300 in accordance with some embodiments. In particular, the table 300 provides $T_{SSB\_measurement\_period\_intra}$ when RRM enhancement for high speed is configured (Frequency range FR1). FR1 may correspond to frequency range 410 mega-Hertz (MHz) to 7125 MHz.

As illustrated in the table, the $T_{SSB\_measurement\_period\_intra}$ may be determined based on a SMTC period and/or a size of DRX cycle based on a size of a DRX cycle or lack of a DRX cycle. For example, the $T_{SSB\_measurement\_period\_intra}$ for a UE with no DRX cycle may be determined by the equation max(200 ms, ceil(5×$K_p$)×SMTC period), where $K_p$ equals 1 when intra-frequency SMTC is fully non overlapping with measurement gaps or intra-frequency SMTC is fully overlapping with MGs or $K_p$ equals 1/(1−(SMTC period/MGRP)), where SMTC period<MGRP when intra-frequency SMTC is partially overlapping with measurement gaps. If different SMTC periodicities are configured for different cells, the SMTC period in the requirement is the one used by the cell being identified. The $T_{SSB\_measurement\_period\_intra}$ for a UE with a DRX cycle less than or equal to 160 ms may be determined by the equation max(200 ms, ceil(5×M2× $K_p$)×max(SMTC period, DRX cycle)), where M2 equals 1.5 if the SMTC periodicity is greater than 40 ms, otherwise M2 equals 1, and where $K_p$ equals 1 when intra-frequency SMTC is fully non overlapping with measurement gaps or intra-frequency SMTC is fully overlapping with MGs or $K_p$ equals 1/(1−(SMTC period/MGRP)), where SMTC period<MGRP when intra-frequency SMTC is partially overlapping with measurement gaps. The $T_{SSB\_measurement\_period\_intra}$ for a UE with a DRX cycle greater than 160 ms and less than 320 ms may be determined by the equation ceil(4× M2× $K_p$)×max(SMTC period, DRX cycle), where M2 equals 1.5 if the SMTC periodicity is greater than 40 ms, otherwise M2 equals 1, and where $K_p$ equals 1 when intra-frequency SMTC is fully non overlapping with measurement gaps or intra-frequency SMTC is fully overlapping with MGs or $K_p$ equals 1/(1−(SMTC period/MGRP)), where SMTC period<MGRP when intra-frequency SMTC is partially overlapping with measurement gaps. The $T_{SSB\_measurement\_period\_intra}$ for a UE with a DRX cycle greater than 320 ms may be determined by the equation ceil(Y×$K_p$)×DRX cycle, where Y equals 3 when SMTC is less than or equal to 40 ms, or Y equals 5 when SMTC is greater than 40 ms, and where $K_p$ equals 1 when intra-frequency SMTC is fully non overlapping with measurement gaps or intra-frequency SMTC is fully overlapping with MGs or $K_p$ equals 1/(1−(SMTC period/MGRP)), where SMTC period<MGRP when intra-frequency SMTC is partially overlapping with measurement gaps.

In R17 HST, after introduce CA for HST UE, the measurement resource may be shared among activated SCCs for intra-frequency measurement without MG. For example, a UE may share a measurement resource among activated SCCs for intra-frequency measurement without MG. In R16 the intra-frequency measurement without MG is defined as in FIG. 3. For FIG. 3, even though no MG is used and high speed flag is configured, the measurement resource may also be sharing among serving CCs, and therefore need to consider the CSSF for intra-frequency measurement without MG.

FIG. 4 illustrates an example measurement period table 400 in accordance with some embodiments. In particular, the table 400 provides measurement periods when RRM enhancement for high speed is configured (FR1). The measurement periods may be utilized where there is a single serving cell and a measurement resource does not need to be shared with other serving CCs. The measurement periods presented within the table 400 may take into consideration the cell identification procedure on deactivated SCC in FR1 CA, the SSB index reading procedure on FR1 CA, and the measurement procedure on deactivated SCC in FR1 CA. The measurement periods may be utilized with intra-frequency measurement with MG in HST in R16 for some embodiments.

In a first option, in R16, network can configure inter-frequency MOs to the HST UE, and if UE has intra-frequency MO with MG, then UE may still share the MG resource with configured inter-frequency MOs even when the high speed flag is indicated to UE. The measurement period for intra-frequency measurement with MG may be updated as in the table of FIG. 4. The $CSSF_{intra}$ is the scaling factor for measurement period of intra-frequency measurement with MG to share the MG resource with configured inter-frequency MOs. For instance, since only one intra-frequency layer is supported in R16 and UE has MG sharing factor between intra-frequency and inter-frequency, then in this case $CSSF_{intra}=K_{intra}$ ($K_{intra}$ definition is same as in TS 38.133 section 9.1.2.1a). In particular, $K_{intra}$ may be equal to 1/X×100 where X depends on a measurement gap sharing scheme (measGapSharingScheme) that allocates measurement resources between inter-frequency and intra-frequency measurements. Accordingly, the $CSSF_{intra}$ may be based on the measGapSharingScheme. The measurement periods provided by the table 300 may take into account the $CSSF_{intra}$ in determining the measurement periods.

For example, the $T_{SSB\_measurement\_period\_intra}$ for a UE with no DRX cycle may be determined by the equation max(200 ms, 5× max(MGRP. SMTC period))×$CSSF_{intra}$. If different SMTC periodicities are configured for different cells, the SMTC period in the requirement is the one used by the cell being identified. The $T_{SSB\_measurement\_period\_intra}$ for a UE with a DRX cycle less than or equal to 160 ms may be determined by the equation max(200 ms, ceil(M2×5)×max(MGRP, SMTC period, DRX cycle))×$CSSF_{intra}$, where M2 equals 1.5 if the SMTC periodicity is greater than 40 ms, otherwise M2 equals 1. The $T_{SSB\_measurement\_period\_intra}$ for a UE with a DRX cycle greater than 160 ms and less than 320 ms may be determined by the equation max(200 ms, ceil (M2×4)×max(MGRP, DRX cycle)×$CSSF_{intra}$, where M2 equals 1.5 if the SMTC periodicity is greater than 40 ms, otherwise M2 equals 1. The $T_{SSB\_measurement\_period\_intra}$ for a UE with a DRX cycle greater than 320 ms may be determined by the equation Y×max(MGRP, DRX cycle)×$CSSF_{intra}$, where Y equals 3 when SMTC is less than or equal to 40 ms, or Y equals 5 when SMTC is greater than 40 ms.

Taking into account $CSSF_{intra}$ in determining the measurement periods may provide scaling of the measurement period of intra-frequency measurement with MG to share the MG resource with configured inter-frequency MOs. For example, the measurement periods may take into account other inter-frequency layers for neighbor cell measurements. In some of these embodiments, the UE may have a single serving cell, but can be configured with different neighbor cells on different frequency layers. The measurement periods may be utilized for measurements related to one or more neighbor cells on different frequency layers.

FIG. 5 illustrates an example procedure 500 for implementing the measurement periods of FIG. 4 in accordance with some embodiments. A UE (such as the UE 102 (FIG. 1)) may implement the procedure for performing measurements based on the measurement periods illustrated in the table 400 (FIG. 4).

The procedure 500 may include determining that the LE is in a high-speed scenario in 502. For example, the UE may determine whether the UE is in a high-speed scenario in a RAN. The UE may determine whether the UE is in a high-speed scenario based on a value of a high speed flag of the UE, where the high speed flag may indicate that the UE is in a high-speed scenario if it is determined that the UE is traveling at a speed greater than a threshold speed value associated with HST, and may indicate that the UE is not in a high-speed scenario if it is determined that the UE is traveling at a speed less than the threshold speed value. A base station may indicate a value for the high speed flag to the UE.

The procedure 500 may include receiving an intra-frequency MO to configure the intra-frequency measurement with the MG resource in 504. For example, the UE may receive an intra-frequency MO from a base station. The base station may operate a primary cell for the UE. The UE may utilized the intra-frequency MO to configure the intra-frequency measurement with the MG resource. In some embodiments, 504 may be omitted.

The procedure 500 may include receiving one or more inter-frequency MOs to configure one or more inter-frequency measurements in 506. For example, the UE may receive one or more inter-frequency MOs from the base station. The UE may utilize the one or more inter-frequency MOs to configure one or more inter-frequency measurements. In some embodiments, 506 may be omitted.

The procedure 500 may include utilizing a $CSSF_{intra}$ to scale the MG resource to accommodate the one or more inter-frequency measurements in 508. For example, the UE may utilize the $CSSF_{intra}$ to scale the MG resource of the intra-frequency measurement from 504. In some embodiments, 508 may be omitted.

The procedure 500 may include determining a measurement period 510. For example, the UE may determine a measurement period for an intra-frequency measurement with MG resource. The UE may determine the measurement period based on the $CSSF_{intra}$ for the high-speed scenario. The UE may determine the measurement period in accordance with the measurement periods presented in the table 400 (FIG. 4). In particular, the UE may utilize one of the equations from the table 400 to determine the measurement period, where the equation utilized may correspond to a size of a DRX cycle for the UE. The measurement period may be an SSB measurement period.

The procedure 500 may include initiating an intra-frequency measurement in 512. For example, the UE may initiate the intra-frequency measurement to be performed during the measurement period. The intra-frequency measurement may comprise an SSB measurement.

Figure 6:
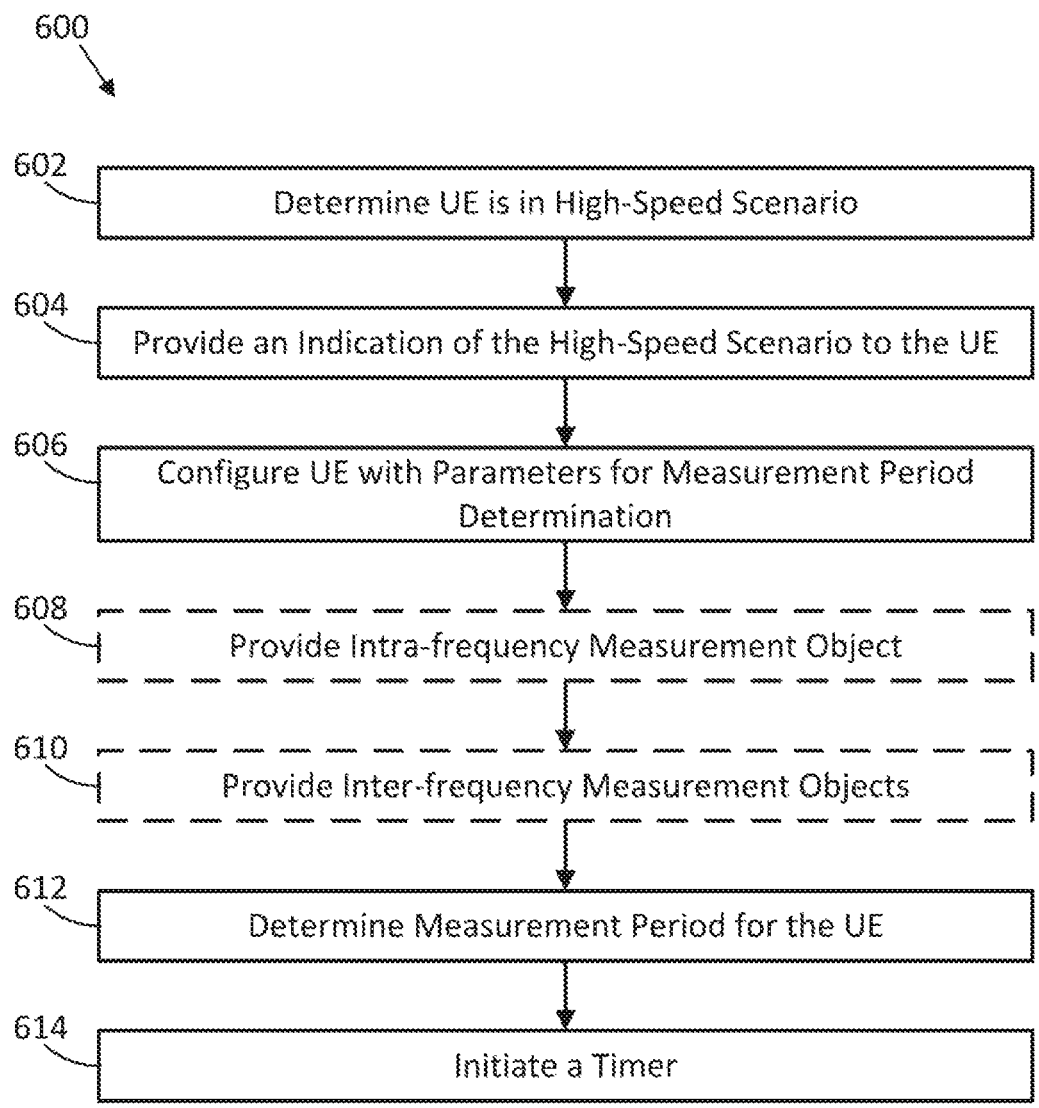
FIG. 6 illustrates an example procedure for implementing the measurement periods of FIG. 4 in accordance with some embodiments.

FIG. 6 illustrates an example procedure 600 for implementing the measurement periods of FIG. 4 in accordance with some embodiments. The procedure 600 may be performed by a base station (such as the gNB 1600 (FIG. 16)) based on the measurement periods included in the table 400 (FIG. 4).

The procedure 600 may include determining that the UE is in a high-speed scenario in 602. For example, the base station may determine a speed of travel of the UE. The base station may compare the speed of travel with a threshold speed value and determine that the base station is in a high-speed scenario based on the speed of travel being greater than the threshold speed value.

The procedure 600 may include providing an indication of the high-speed scenario to the UE in 604. For example, the base station may provide an indication to the UE that the UE is in a high-speed scenario based on the determination of 602.

The procedure 600 may include configuring the UE with parameters for measurement period determination by the UE in 606. For example, the base station may configure the UE with values of the MGRP, the SMTC period, and/or the size of the DRX cycle to be utilized by the UE for determining a measurement period.

The procedure 600 may include providing an intra-frequency measurement object in 608. For example, the base station may provide the UE with an intra-frequency measurement object for use in 504 (FIG. 5). In some embodiments, 608 may be omitted.

The procedure 600 may include providing one or more inter-frequency measurement objects in 610. For example, the base station may provide the UE with one or more inter-frequency measurement objects for use in 506 (FIG. 5). In some embodiments, 610 may be omitted.

The procedure 600 may further include determining a measurement period for the UE in 612. For example, the base station may determine a measurement period in accordance with the measurement period provided in the table 400. The measurement period determined by the base station may be the measurement period to be utilized by the UE for performing an intra-frequency measurement in accordance with the procedure 500 (FIG. 5).

The procedure 600 may further include initiating timer in 614. For example, the base station may initiate an internal timer based with the measurement period determined in 612. The internal timer may allow the base station to be aware of the timer of the UE.

In a second option for intra-frequency measurement with MG in HST in R16, in R16, the network may avoid to configure inter-frequency MOs to HST UE and UE may only need to measure one intra-frequency MO with or without MG. All the measurement period applies in TS 38.133 for R16 HST UE only if the above restriction at network (NW) applies. In this option, a base station may avoid configuring inter-frequency MOs to a UE in high-speed mode. The UE may measure a single intra-frequency MO with or without MG.

Figure 7:
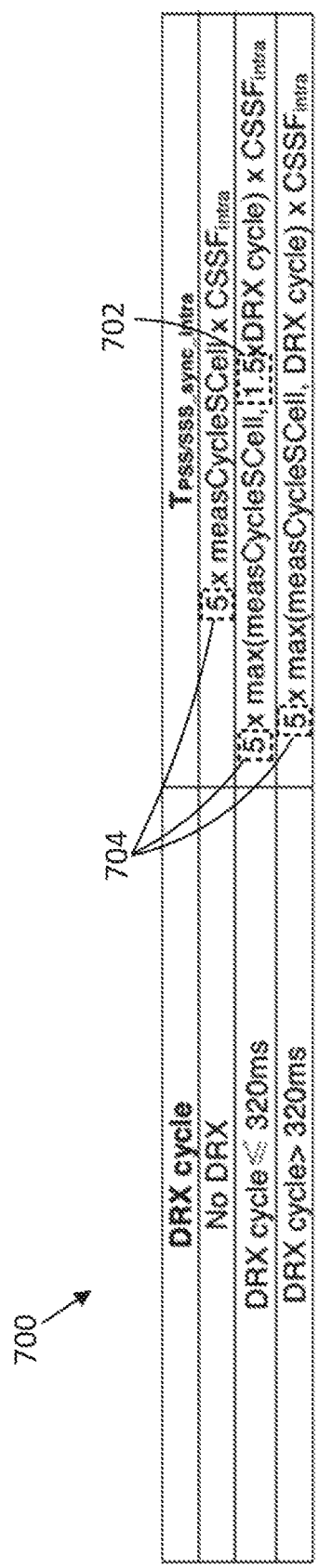
FIG. 7 illustrates an example time period table in accordance with some embodiments.

FIG. 7 illustrates an example time period table 700 in accordance with some embodiments. In particular, the table 700 provides time periods for primary synchronization signal (PSS)/secondary synchronization signal (SSS) detection, deactivated secondary cell (SCell) (FR1). The time periods may be utilized for PSS/SSS detection in R17 HST in FR1 CA. The table 700 shown is the existing table in legacy TS 38.133, and it may be updated for enhancement as indicated herein.

If HST UE is operating in NR CA, or HST UE has measurements on deactivated SCC with measCycleSCell (measCycleSCell is the measurement periodicity of deactivated SCC), the corresponding identification or measurement delay may be updated from legacy time periods. For cell identification on deactivated SCC, some update/enhancements may be made based on the legacy PSS/SSS detection period for deactivated SCC.

The table 700 illustrates time periods for PSS/SSS detection in accordance with legacy implementations of the time periods. The time period utilized for PSS/SSS detection may be based on a DRX cycle of a UE. For example, the PSS/SSS detection time period for intra-frequency ($T_{PSS/SSS\_sync\_intra}$) for a UE with no DRX cycle may be determined by the equation $5 \times measCycleSCell \times CSSF_{intra}$. The $T_{PSS/SSS\_sync\_intra}$ for a UE with a DRX cycle less than or equal to 320 ms may be determined by the equation $5 \times max(measCycleSCell, 1.5 \times DRX\ cycle) \times CSSF_{intra}$. The $T_{PSS/SSS\_sync\_intra}$ for a UE with a DRX cycle greater than 320 ms may be determined by the equation $5 \times max(measCycleSCell, DRX\ cycle) \times CSSF_{intra}$.

The approaches presented herein for PSS/SSS detection in R17 HST in FR1 CA may include updating one or more of the values within the equations for the $T_{PSS/SSS\_sync\_intra}$. For example, a scaling factor and/or a sample number for layer 1 (L1) filtering may be updated from the legacy values for the PSS/SSS detection.

In some embodiments, a scaling factor 702 for DRX cycle may be updated within the equations. As can be seen from the table 700, the scaling factor 702 in the legacy $T_{PSS/SSS\_sync\_intra}$ calculation may be included for DRX cycles less than or equal to 320 ms, and may have a value of 1.5. In a first option, the scaling factor 702 of 1.5 for DRX≤320 ms may be removed for HST. In particular, the scaling factor 702 may be changed to 1, thereby removing a scaling of the DRX cycle value performed by the legacy scaling factor. In a second option, the scaling factor 702 of 1.5 for DRX≤320 ms may be applied when measCycleSCell>X, X is a predefined threshold. e.g., X=320 ms; otherwise the scaling factor 702 of 1.5 for DRX≤320 ms may be removed for HST. In particular, the scaling factor 702 may be changed to 1, unless a value of measCycleSCell is larger than a predefined threshold X. Accordingly, the scaling factor 702 may be changed to 1 when the value of measCycleSCell is less than or equal to the predefined threshold X. In some embodiments, the predefined threshold may be 320 ms. In instances where the measCycleSCell is smaller than the predefined threshold X, the value of the scaling factor 702 may be 1.5.

In some embodiments, a sample number 704 for L1 filtering may be updated. As can be seen from the table, the sample number 704 in the legacy $T_{PSS/SSS\_sync\_intra}$ calculation may be included for no DRX cycle, DRX cycles less than or equal to 320 ms, and DRX cycles greater than 320 ms, where the value of the sample number 704 in the legacy $T_{PSS/SSS\_sync\_intra}$ has a value of 5. In a first option, the sample number 704 for L1 filtering for HST UE may be reduced to be less than 5.

In a second option, the sample number 704 may be determined based on different measCycleSCell, and different measCycleSCell may require different sample number, those enhanced sample number may be equal to or less than 5. For example, the sample number 704 may be determined based on a value of measCycleSCell, where the determined value may be less than or equal 5. Larger measCycleSCell may have more sample number. In particular, the sample number 704 may be proportional to the measCycleSCell, where larger measCycleSCell correspond to larger sample numbers and smaller measCycleSCell correspond to smaller sample numbers.

In a third option, the sample number 704 may be determined based on different DRX cycle, and different DRX cycle may require different sample number, those enhanced sample number may be equal to or less than 5. For example, the sample number 704 may be determined based on a size of the DRX cycle, where the determined value may be less than or equal to 5. Larger DRX cycle may have less sample number. In particular, the sample number 704 may be inversely proportional to the size of the DRX cycle, where larger DRX cycles correspond to smaller sample numbers and smaller DRX cycles correspond to larger sample numbers.

In a fourth option, the sample number 704 may be determined based on different value of max(measCycleSCell, DRX cycle), and different value of max(measCycleSCell, DRX cycle) may require different sample number, those enhanced sample number may be equal to or less than 5, if DRX>320 ms. For example, the sample number 704 may be determined based on a maximum of the measCycleSCell or the DRX cycle when the DRX cycle is greater than 320 ms and the scaling factor 702 is 1. The sample number 704 may be determined based on different value of max(measCycleSCell, 1.5*DRX cycle), and different value of max(measCycleSCell, 1.5*DRX cycle) may require different sample number, those enhanced sample number may be equal to or less than 5, if DRX<=320 and if scaling factor 702 is 1.5. For example, the sample number 704 may be determined based on a maximum of the measCycleSCell or 1.5 times the DRX cycle when the DRX cycle is less than or equal to 320 ms and the scaling factor 702 is 1.5. The sample number 704 may be proportional to the measCycleSCell when the measCycleSCell is utilized, and may be inversely proportional to the size of the DRX cycle when the DRX cycle is utilized.

Figure 8:
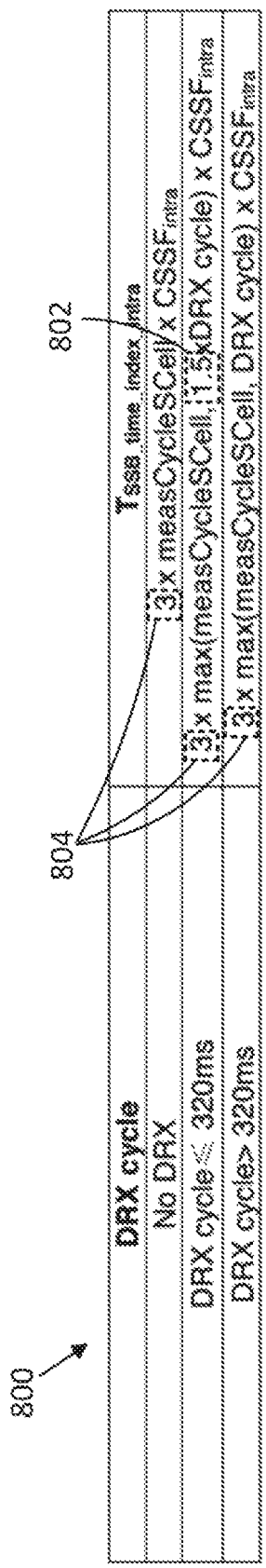
FIG. 8 illustrates an example time period table in accordance with some embodiments.

FIG. 8 illustrates an example time period table 800 in accordance with some embodiments. In particular, the table 800 provides time periods for time index detection, deactivated SCell (FR1). The time periods may be utilized for SSB index detection in R17 HST in FR1 CA. The table 800 shown is the existing table in legacy TS 38.133, and it may be updated for enhancement as indicated herein.

If HST UE is operating in NR CA, or HST UE has measurements on deactivated SCC with measCycleSCell (measCycleSCell is the measurement periodicity of deactivated SCC), the corresponding identification or measurement delay may be updated from legacy time periods. For time index detection on deactivated SCC, some update/enhancements may be made based on the legacy time index detection period for deactivated SCC.

The table 800 illustrates time periods for SSB index detection in accordance with legacy implementations of the time periods. The time period utilized for SSB index detection may be based on a DRX cycle of a UE. For example, the SSB index detection time period for intra-frequency ($T_{SSB\_time\_index\_intra}$) for a UE with no DRX cycle may be determined by the equation $3 \times measCycleSCell \times CSSF_{intra}$. The $T_{SSB\_time\_index\_intra}$ for a UE with a DRX cycle less than or equal to 320 ms may be determined by the equation $3 \times max(measCycleSCell, 1.5 \times DRX\ cycle) \times CSSF_{intra}$. The $T_{SSB\_time\_index\_intra}$ for a UE with a DRX cycle greater than 320 ms may be determined by the equation $3 \times max(measCycleSCell, DRX\ cycle) \times CSSF_{intra}$.

The approaches presented herein for SSB index detection in R17 HST in FR1 CA may include updating one or more of the values within the equations for the $T_{SSB\_time\_index\_intra}$. For example, a scaling factor and/or a sample number for L1 filtering may be updated from the legacy values for the SSB index detection.

In some embodiments, a scaling factor 802 for DRX cycle may be updated within the equations. As can be seen from the table 800, the scaling factor 802 in the legacy $T_{SSB\_time\_index\_intra}$ calculation may be included for DRX cycles less than or equal to 320 ms, and may have a value of 1.5. In a first option, the scaling factor 802 of 1.5 for DRX 320 ms may be removed for HST. In particular, the scaling factor 802 may be changed to 1, thereby removing a scaling of the DRX cycle value performed by the legacy scaling factor. In a second option, the scaling factor 802 of 1.5 for DRX≤320 ms may be applied when measCycleSCell>X, X is a predefined threshold, e.g., X=320 ms; otherwise the scaling factor 802 of 1.5 for DRX≤320 ms may be removed for HST. In particular, the scaling factor 802 may be changed to 1, unless a value of measCycleSCell is larger than a predefined threshold X. Accordingly, the scaling factor 802 may be changed to 1 when the value of measCycleSCell is less than or equal to the predefined threshold X. In some embodiments, the threshold may be 320 ms. In instances where the measCycleSCell is smaller than the predefined threshold X, the value of the scaling factor 802 may be 1.5.

In some embodiments, a sample number 804 for L1 filtering may be updated. As can be seen from the table, the sample number 804 in the legacy $T_{SSB\_time\_index\_intra}$ calculation may be included for no DRX cycle, DRX cycles less than or equal to 320 ms, and DRX cycles greater than 320 ms, where the value of the sample number 804 in the legacy $T_{SSB\_time\_index\_intra}$ has a value of 3. In a first option, the sample number 804 for L1 filtering for HST UE may be reduced to be less than 3.

In a second option, the sample number 804 may be determined based on different measCycleSCell, and different measCycleSCell may require different sample number, those enhanced sample number may be equal to or less than 3. For example, the sample number 804 may be determined based on a value of measCycleSCell, where the determined value may be less than or equal 3. Larger measCycleSCell may have more sample number. In particular, the sample number 804 may be proportional to the measCycleSCell, where larger measCycleSCell correspond to larger sample numbers and smaller measCycleSCell correspond to smaller sample numbers.

In a third option, the sample number 804 may be determined based on different DRX cycle, and different DRX cycle may require different sample number, those enhanced sample number may be equal to or less than 3. For example, the sample number 804 may be determined based on a size of the DRX cycle, where the determined value may be less than or equal to 3. Larger DRX cycle may have less sample number. In particular, the sample number 804 may be inversely proportional to the size of the DRX cycle, where larger DRX cycles correspond to smaller sample numbers and smaller DRX cycles correspond to larger sample numbers.

In a fourth option, the sample number 804 may be determined based on different value of max(measCycleSCell, DRX cycle), and different value of max(measCycleSCell, DRX cycle) may require different sample number, those enhanced sample number may be equal to or less than 3, if DRX>320 ms. For example, the sample number 804 may be determined based on a maximum of the measCycleSCell or the DRX cycle when the DRX cycle is greater than 320 ms and the scaling factor 802 is 1. The sample number 804 may be determined based on different value of max(measCycleSCell, 1.5*DRX cycle), and different value of max(measCycleSCell, 1.5*DRX cycle) may require different sample number, those enhanced sample number may be equal to or less than 3, if DRX<=320 ms and if scaling factor 802 is 1.5. For example, the sample number 804 may be determined based on a maximum of the measCycleSCell or 1.5 times the DRX cycle when the DRX cycle is less than or equal to 320 ms and the scaling factor 802 is 1.5. The sample number 804 may be proportional to the measCycleSCell when the measCycleSCell is utilized, and may be inversely proportional to the size of the DRX cycle when the DRX cycle is utilized.

Figure 9:
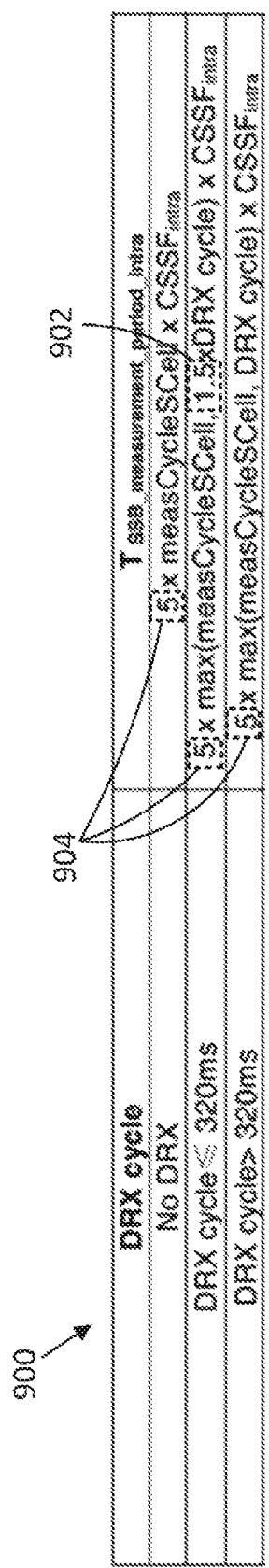
FIG. 9 illustrates an example measurement period table in accordance with some embodiments.

FIG. 9 illustrates an example measurement period table 900 in accordance with some embodiments. In particular, the table 900 provides measurement periods for intra-frequency measurements without gaps (deactivated SCell) (FR1). The measurements periods may be utilized for measurements of deactivated SCCs in R17 HST in FR1 CA. The table 900 shown is the existing table in legacy TS 38.133, and it may be updated for enhancement as indicated herein.

If HST UE is operating in NR CA, or HST UE has measurements on deactivated SCC with measCycleSCell (measCycleSCell is the measurement periodicity of deactivated SCC), the corresponding identification or measurement delay may be updated from legacy time periods. For measurements on deactivated SCC, some update/enhancements may be made based on the legacy measurement period for deactivated SCC.

The table 900 illustrates measurement periods for measurement of deactivated SCCs in accordance with legacy implementations of the measurement periods. The measurement period utilized for measurement of deactivated SCC may be based on a DRX cycle of a UE. For example, the measurement period for deactivated SCC for intra-frequency ($T_{SSB\_time\_index\_intra}$) for a UE with no DRX cycle may be determined by the equation 5×measCycleSCell× $CSSF_{intra}$. The $T_{SSB\_time\_index\_intra}$ for a UE with a DRX cycle less than or equal to 320 ms may be determined by the equation 5×max(measCycleSCell, 1.5×DRX cycle)×$CSSF_{intra}$. The $T_{SSB\_time\_index\_intra}$ for a UE with a DRX cycle greater than 320 ms may be determined by the equation 5×max(measCycleSCell, DRX cycle)×$CSSF_{intra}$.

The approaches presented herein for measurement period for deactivated SCC in R17 HST in FR1 CA may include updating one or more of the values within the equations for the $T_{SSB\_time\_index\_intra}$. For example, a scaling factor and/or a sample number for L1 filtering may be updated from the legacy values for the measurement period for deactivated SCC.

In some embodiments, a scaling factor 902 for DRX cycle may be updated within the equations. As can be seen from the table 900, the scaling factor 902 in the legacy $T_{SSB\_time\_index\_intra}$ calculation may be included for DRX cycles less than or equal to 320 ms, and may have a value of 1.5. In a first option, the scaling factor 902 of 1.5 for DRX≤320 ms may be removed for HST. In particular, the scaling factor 902 may be changed to 1, thereby removing a scaling of the DRX cycle value performed by the legacy scaling factor. In a second option, the scaling factor 902 of 1.5 for DRX≤320 ms may be applied when measCycleSCell>X, X is a predefined threshold, e.g., X=320 ms; otherwise the scaling factor 902 of 1.5 for DRX≤320 ms may be removed for HST. In particular, the scaling factor 902 may be changed to 1, unless a value of measCycleSCell is larger than a predefined threshold X. Accordingly, the scaling factor 902 may be changed to 1 when the value of measCycleSCell is less than or equal to the predefined threshold X. In some embodiments, the threshold may be 320 ms. In instances where the measCycleSCell is smaller than the predefined threshold X, the value of the scaling factor 902 may be 1.5.

In some embodiments, a sample number 904 for L filtering may be updated. As can be seen from the table, the sample number 904 in the legacy $T_{SSB\_time\_index\_intra}$ calculation may be included for no DRX cycle, DRX cycles less than or equal to 320 ms, and DRX cycles greater than 320 ms, where the value of the sample number 904 in the legacy $T_{SSB\_time\_index\_intra}$ has a value of 5. In a first option, the sample number 904 for L1 filtering for HST UE may be reduced to be less than 5.

In a second option, the sample number 904 may be determined based on different measCycleSCell, and different measCycleSCell may require different sample number, those enhanced sample number may be equal to or less than 5. For example, the sample number 904 may be determined based on a value of measCycleSCell, where the determined value may be less than or equal 5. Larger measCycleSCell may have more sample number. In particular, the sample number 904 may be proportional to the measCycleSCell, where larger measCycleSCell correspond to larger sample numbers and smaller measCycleSCell correspond to smaller sample numbers.

In a third option, the sample number 904 may be determined based on different DRX cycle, and different DRX cycle may require different sample number, those enhanced sample number may be equal to or less than 5. For example, the sample number 904 may be determined based on a size of the DRX cycle, where the determined value may be less than or equal to 5. Larger DRX cycle may have less sample number. In particular, the sample number 904 may be inversely proportional to the size of the DRX cycle, where larger DRX cycles correspond to smaller sample numbers and smaller DRX cycles correspond to larger sample numbers.

In a fourth option, the sample number 904 may be determined based on different value of max(measCycleSCell, DRX cycle), and different value of max(measCycleSCell, DRX cycle) may require different sample number, those enhanced sample number may be equal to or less than 5, if DRX>320 ms. For example, the sample number 904 may be determined based on a maximum of the measCycleSCell or the DRX cycle when the DRX cycle is greater than 320 ms and the scaling factor 902 is 1. The sample number 904 may be determined based on different value of max(measCycleSCell, 1.5*DRX cycle), and different value of max(measCycleSCell, 1.5*DRX cycle) may require different sample number, those enhanced sample number may be equal to or less than 5, if DRX<=320 and if scaling factor 902 is 1.5. For example, the sample number 904 may be determined based on a maximum of the measCycleSCell or 1.5 times the DRX cycle when the DRX cycle is less than or equal to 320 ms and the scaling factor 802 is 1.5. The sample number 904 may be proportional to the measCycleSCell when the measCycleSCell is utilized, and may be inversely proportional to the size of the DRX cycle when the DRX cycle is utilized.

Figure 10:
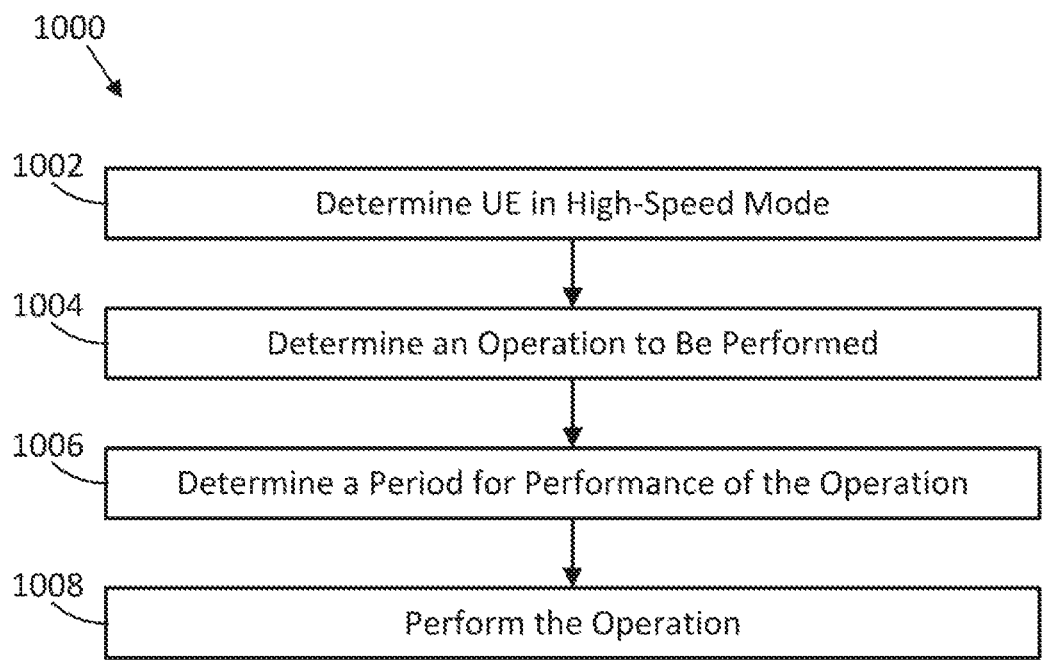
FIG. 10 illustrates an example procedure for performance of an operation in accordance with some embodiments.

FIG. 10 illustrates an example procedure 1000 for performance of an operation in accordance with some embodiments. In particular, a UE (such as the UE 102 (FIG. 1)) may perform the procedure 1000 in performance of the operation. The operation may be one of the operations described in relation to any of FIGS. 7-9, and the time period or measurement period in accordance with the tables presented in FIGS. 7-9. For example, the operation may include performance of a PSS/SSS detection, performance of an SSB index detection, or performance of a measurement in R17 HST in FR1 CA. The time period or measurement period may include the $T_{PSS/SSS\_sync\_intra}$ of the table 700 (FIG. 7), the $T_{SSB\_time\_index\_intra}$ of the table 800 (FIG. 8), or the $T_{SSB\_time\_index\_intra}$ of the table 900 (FIG. 9), where the determination of the time period or measurement period may be calculated with the updated scaling factor for DRX cycle and/or the updated sample number for L1 filtering as described in relation to any of FIGS. 7-9.

The procedure 1000 may include determining that the UE is in high-speed mode in 1002. For example, the UE may determine that the UE is connected to a base station in high-speed mode in FR CA. The UE may determine that the UE is in the high-speed mode based on a value of a high speed flag of the UE. The value of the high speed flag may be configured by a base station.

The procedure 1000 may include determining an operation to be performed in 1004. For example, the UE may determine an operation to be performed by the UE on a deactivated SCC. The operation may include one of the PSS/SSS detection, the SSB index detection, or the intra-frequency measurement without gaps on the deactivated SCC as described in relation to FIGS. 7-9, respectively.

The procedure 1000 may include determining a period for performance of the operation in 1006. For example, the UE may determine a period for the PSS/SSS detection, the SSB index detection, or the measurement on the deactivated SCC based on the operation determined in 1004. The period may be a time period (such as in the case of the PSS/SSS detection or the SSB index detection on the deactivated SCC) or a measurement period (such as the case of the measurement on the deactivated SCC). In the case of the PSS/SSS detection on the deactivated SCC, the period may be determined in accordance with the time period calculation provided in the table 700 with the updated scaling factor for DRX cycle and/or the updated sample number for L1 filtering as described in relation to the table 700. In the case of the SSB index detection on the deactivated SCC, the period may be determined in accordance with the time period calculation provided in the table 800 with the updated scaling factor for DRX cycle and/or the updated sample number for L1 filtering as described in relation to the table 800. In the case of the intra-frequency measurement without gaps on the deactivated SCC, the period may be determined in accordance with the measurement period calculation provided in the table 900 with the updated scaling factor for DRX cycle and/or the updated sample number for L1 filtering as described in relation to the table 900.

The procedure 1000 may include performing the operation in 1008. For example, the UE may perform a PSS/SSS detection operation, a SSB index detection operation, or an intra-frequency measurement operation without gaps on the deactivated SCC as determined in 1004. The UE may utilize the time period or the measurement period determined in 1006 for performance of the operation.

Figure 11:
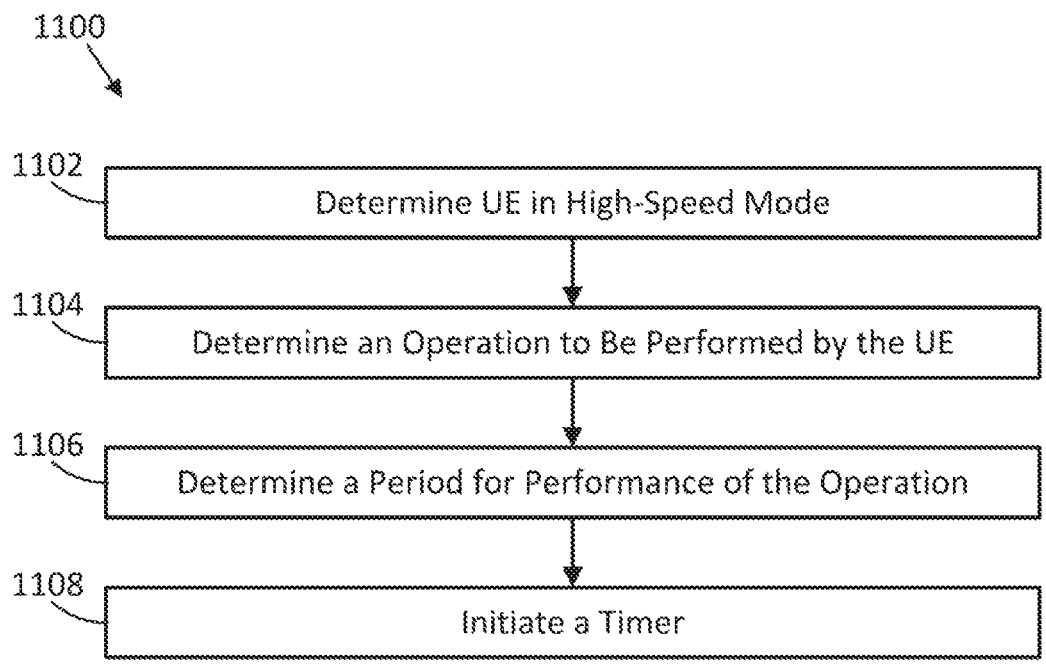
FIG. 11 illustrates an example procedure in accordance with some embodiments.

FIG. 11 illustrates an example procedure 1100 in accordance with some embodiments. In particular, a base station (such as the base stations of FIG. 1 or the gNB 1600 (FIG. 16)) may perform the procedure 1100 for performance of an operation by a UE connected to the base station. The operation may be one of the operations described in relation to any of FIGS. 7-9, and the time period or measurement period in accordance with the tables presented in FIGS. 7-9. For example, the operation may include performance of a PSS/SSS detection, performance of an SSB index detection, or performance of a measurement in R17 HST in FR1 CA. The time period or measurement period may include the $T_{PSS/SSS\_sync\_intra}$ of the table 700 (FIG. 7), the $T_{SSB\_time\_index\_intra}$ of the table 800 (FIG. 8), or the $T_{SSB\_time\_index\_intra}$ of the table 900 (FIG. 9), where the determination of the time period or measurement period may be calculated with the updated scaling factor for DRX cycle and/or the updated sample number for L1 filtering as described in relation to any of FIGS. 7-9.

The procedure 1100 may include determining that the UE is in high-speed mode in 1102. For example, the base station may determine that the UE is connected to a base station in high-speed mode in FR CA. The base station may determine that the UE is in high-speed mode by determining a speed of travel of the UE and determining that the speed of travel of the UE exceeds a threshold travel speed corresponding to high-speed mode.

The procedure 1100 may include determining an operation to be performed in 1104. For example, the base station may determine an operation to be performed by the UE on a deactivated SCC. The operation may include one of the PSS/SSS detection, the SSB index detection, or the intra-frequency measurement without gaps on the deactivated SCC as described in relation to FIGS. 7-9, respectively.

The procedure 1100 may include determining a period for performance of the operation in 1106. For example, the base station may determine a period for the PSS/SSS detection, the SSB index detection, or the measurement on the deactivated SCC based on the operation determined in 1104. The period may be a time period (such as in the case of the PSS/SSS detection or the SSB index detection on the deactivated SCC) or a measurement period (such as the case of the measurement on the deactivated SCC). In the case of the PSS/SSS detection on the deactivated SCC, the period may be determined in accordance with the time period calculation provided in the table 700 with the updated scaling factor for DRX cycle and/or the updated sample number for L1 filtering as described in relation to the table 700. In the case of the SSB index detection on the deactivated SCC, the period may be determined in accordance with the time period calculation provided in the table 800 with the updated scaling factor for DRX cycle and/or the updated sample number for L1 filtering as described in relation to the table 800. In the case of the intra-frequency measurement without gaps on the deactivated SCC, the period may be determined in accordance with the measurement period calculation provided in the table 900 with the updated scaling factor for DRX cycle and/or the updated sample number for L1 filtering as described in relation to the table 900.

The procedure 1100 may include initiating a timer in 1108. For example, the base station may initiate an internal timer in accordance with the period determined in 1106. The internal timer may provide the base station with awareness of a timer of the UE being utilized for the operation and/or a progress of the operation.

Figure 12:
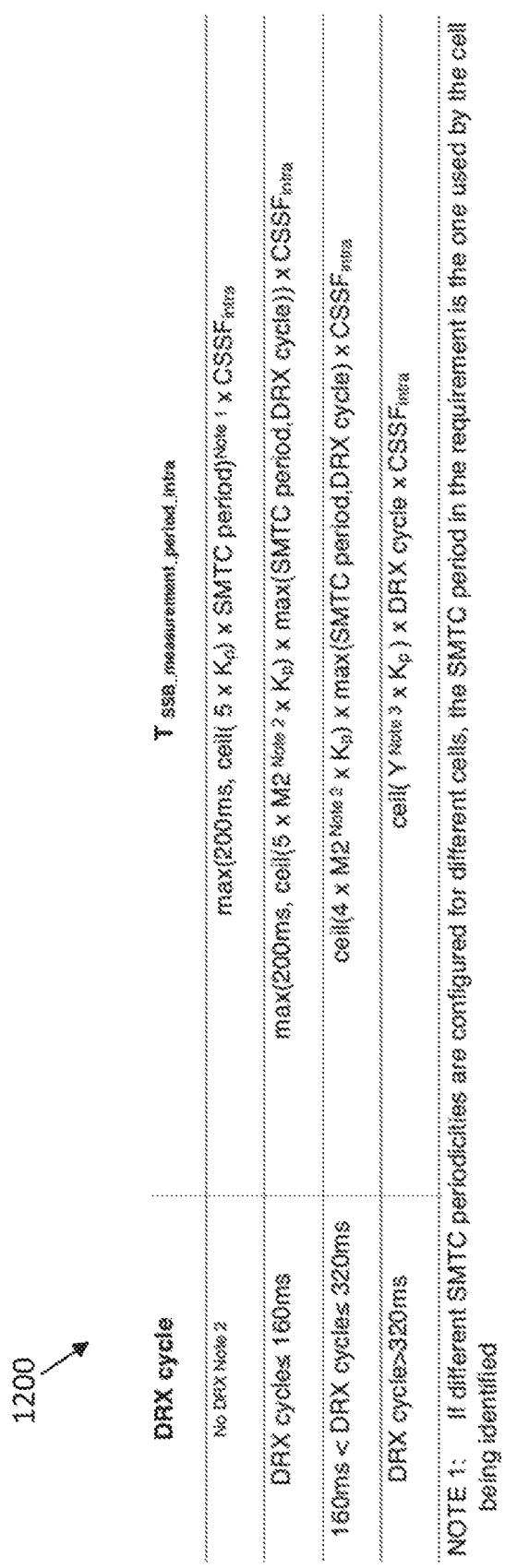
FIG. 12 illustrates an example measurement period table in accordance with some embodiments.

FIG. 12 illustrates an example measurement period table 1200 in accordance with some embodiments. In particular, the table 1200 provides measurement periods for R17 intra-frequency measurements without MG for HST. The measurement periods may be SSB measurement periods ($T_{SSB\_time\_index\_intra}$).

In R17 HST, after introduce CA for HST UE, the measurement resource may be shared among activated SCCs for intra-frequency measurement without MG even when the high speed flag is indicated to UE. For example, a measurement resource (which may be referred to as a searcher resource in some instances where the measurement resource is in the baseband) may be shared among active serving CCs by the UE for intra-frequency measurement without MG when the high speed flag indicates that the UE is in high-speed mode. The measurement period for intra-frequency measurement without MG may be updated as in the table 1200 shown in FIG. 12. For example, the measurement period for the intra-frequency measurement without MG may be determined in accordance with the calculations provided in the table 1200.

The measurement periods provided by the table 1200 may take into account the $CSSF_{intra}$ in determining the measurement periods. Further, the calculation for the measurement periods may depend on a DRX cycle for the HST LE performing the intra-frequency measurement without MG. For example, the $T_{SSB\_time\_index\_intra}$ for a UE with no DRX cycle may be determined by the equation max(200 ms, ceil($5 \times K_p$)×SMTC period)×$CSSF_{intra}$, where $K_p$ equals 1 when intra-frequency SMTC is fully non overlapping with measurement gaps or intra-frequency SMTC is fully overlapping with MGs or $K_p$ equals 1/(1−(SMTC period/ MGRP)), where SMTC period C MGRP when intra-frequency SMTC is partially overlapping with measurement gaps. If different SMTC periodicities are configured for different cells, the SMTC period in the requirement is the one used by the cell being identified. The $T_{SSB\_time\_index\_intra}$ for a UE with a DRX cycle less than or equal to 160 ms may be determined by the equation max(200 ms, ceil(5×M2× $K_p$)×max(SMTC period. DRX cycle))×$CSSF_{intra}$, where M2 equals 1.5 if the SMTC periodicity is greater than 40 ms, otherwise M2 equals 1, and where $K_p$ equals 1 when intra-frequency SMTC is fully non overlapping with measurement gaps or intra-frequency SMTC is fully overlapping with MGs or $K_p$ equals 1/(1−(SMTC period/MGRP)), where SMTC period<MGRP when intra-frequency SMTC is partially overlapping with measurement gaps. The $T_{SSB\_time\_index\_intra}$ for a UE with a DRX cycle greater than 160 ms and less than 320 ms may be determined by the equation ceil(4×M2×$K_p$)×max(SMTCperiod, DRX cycle)× $CSSF_{intra}$, where M2 equals 1.5 if the SMTC periodicity is greater than 40 ms, otherwise M2 equals 1, and where $K_p$ equals 1 when intra-frequency SMTC is fully non overlapping with measurement gaps or intra-frequency SMTC is fully overlapping with MGs or $K_p$ equals 1/(1−(SMTC period/MGRP)), where SMTC period<MGRP when intra-frequency SMTC is partially overlapping with measurement gaps. The $T_{SSB\_time\_index\_intra}$ for a UE with a DRX cycle greater than 320 ms may be determined by the equation ceil(Y×$K_p$)×DLX cycle×$CSSF_{intra}$, where Y equals 3 when SMTC is less than or equal to 40 ms and Y equals 5 when SMTC is greater than 40 ms, and where $K_p$ equals 1 when intra-frequency SMTC is fully non overlapping with measurement gaps or intra-frequency SMTC is fully overlapping with MGs or $K_p$ equals 1/(1−(SMTC period/MGRP)), where SMTC period<MGRP when intra-frequency SMTC is partially overlapping with measurement gaps.

The $CSSF_{intra}$ is the scaling factor for measurement period of intra-frequency measurement without MG to share the searcher resource among active serving CCs. For instance. '$CSSF_{intra}$=1' for HST PCC, and '$CSSF_{intra}$=number of HST SCC' for each of the HST SCC in CA. For example, the $CSSF_{intra}$ may be utilized to scale the measurement period for intra-frequency measurement without MG where the UE is to share a searcher resource among active serving CCs. $CSSF_{intra}$ may be equal to 1 in the equations presented in table 1200 for HST primary component carrier (PCC) measurement, and may be equal to the number of HST SCCs for HST SCC measurement.

Figure 13:
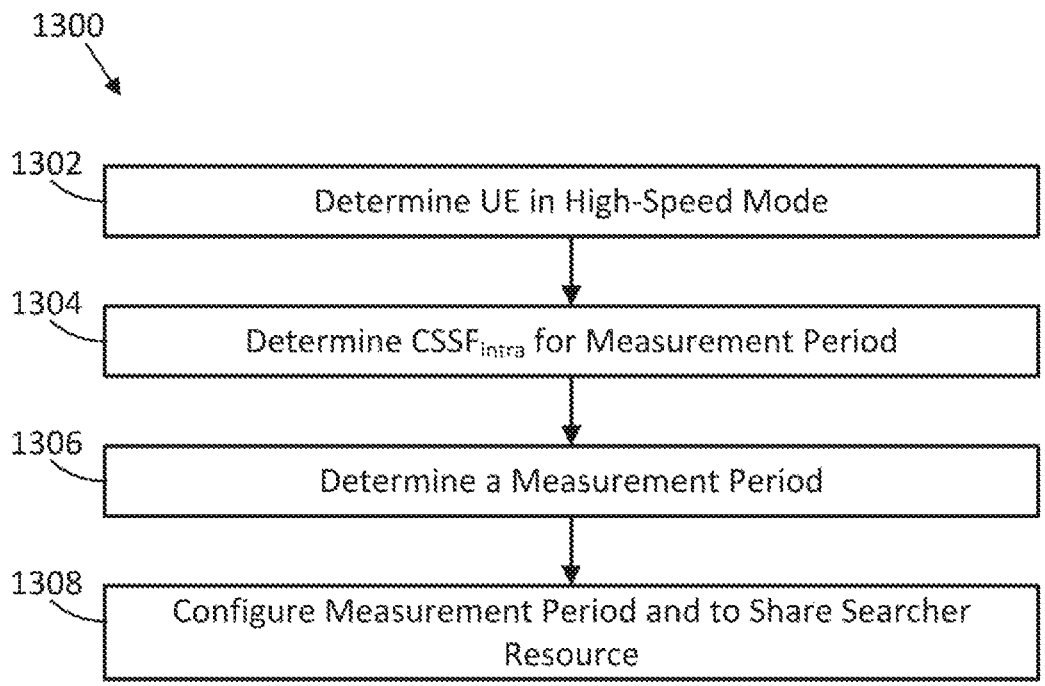
FIG. 13 illustrates an example procedure in accordance with some embodiments.

FIG. 13 illustrates an example procedure 1300 in accordance with some embodiments. In particular, the procedure 1300 may be utilized for R17 intra-frequency measurement without MG for HST. A UE (such as the UE 102 (FIG. 1)) may perform the procedure 1300 for performance of intra-frequency measurement without MG for HST.

The procedure 1300 may include determining the UE is in high-speed mode in 1302. For example, the UE may determine that the UE is connected to a base station in high-speed mode in CA. The UE may determine that the UE is in high-speed mode based on a high speed flag indicated to the UE.

The procedure 1300 may include determining a $CSSF_{intra}$ for measurement period in 1304. For example, the UE may determine the $CSSF_{intra}$ for a measurement period of intra-frequency measurement without MG. The UE may determine the $CSSF_{intra}$ to be equal to 1 for in instances where the intra-frequency measurement is for a HST PCC, and may determine the $CSSF_{intra}$ to be equal to a number of HST SCCs where the intra-frequency measurement is for HST SCC.

The procedure 1300 may include determining a measurement period in 1306. For example, the UE may determine a measurement period for the intra-frequency measurement without MG. The measurement period may be determined based on the $CSSF_{intra}$. In particular, the measurement period may be determined in accordance with the calculations for the measurement period included in the table 1200 (FIG. 12) with the $CSSF_{intra}$ being of the value determined in 1304.

The procedure 1300 may include configuring a measurement period and to share a searcher resource in 1308. For example, the UE may configure the measurement period in accordance with the measurement period determined in 1306. Further, the UE may configure to share a searcher resource among active serving CCs for intra-frequency measurement without MG. The UE may then perform intra-frequency measurement without MG for HST with the configured measurement period and the searcher resource shared among active serving CCs.

Figure 14:
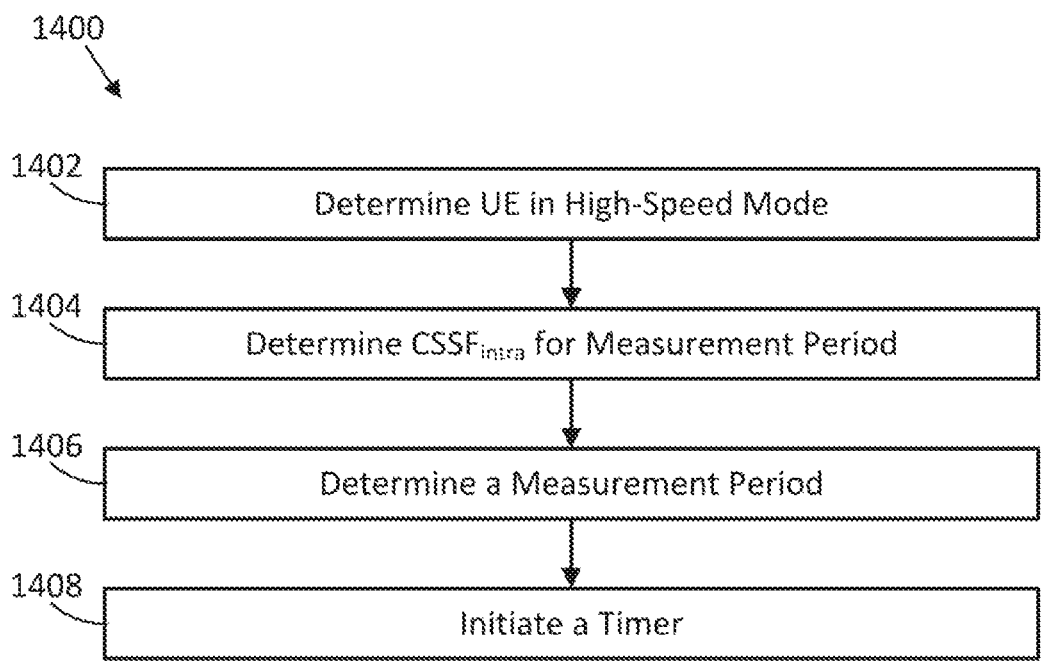
FIG. 14 illustrates an example procedure in accordance with some embodiments.

FIG. 14 illustrates an example procedure 1400 in accordance with some embodiments. In particular, the procedure 1400 may be utilized for R17 intra-frequency measurement without MG for HST. A base station (such as the base stations of FIG. 1 or the gNB 1600 (FIG. 16)) may perform the procedure 1400 for performance of intra-frequency measurement without MG for HST.

The procedure 1400 may include determining a UE is in high-speed mode in 1402. For example, the base station may determine that the UE is connected to the base station in high-speed mode in CA. The base station may determine a speed of travel of the UE. The base station may compare the speed of travel with a threshold speed value and determine that the base station is in a high-speed scenario based on the speed of travel being greater than the threshold speed value.

The procedure 1400 may include determining a $CSSF_{intra}$ for measurement period in 1404. For example, the base station may determine the $CSSF_{intra}$ for a measurement period of intra-frequency measurement without MG. The base station may determine the $CSSF_{intra}$ to be equal to 1 for in instances where the intra-frequency measurement is for a HST PCC, and may determine the $CSSF_{intra}$ to be equal to a number of HST SCCs where the intra-frequency measurement is for HST SCC.

The procedure 1400 may include determining a measurement period in 1406. For example, the base station may determine a measurement period for the intra-frequency measurement without MG. The measurement period may be determined based on the $CSSF_{intra}$. In particular, the measurement period may be determined in accordance with the calculations for the measurement period included in the table 1200 (FIG. 12) with the $CSSF_{intra}$ being of the value determined in 1404.

The procedure 1400 may include initiating a timer in 1408. For example, the base station may initiate an internal timer in accordance with the period determined in 1406. The internal timer may provide the base station with awareness of a timer of the UE being utilized for the intra-frequency measurement and/or a progress of the intra-frequency measurement.

FIG. 15 illustrates an example UE 1500 in accordance with some embodiments. The UE 1500 may be any mobile or non-mobile computing device, such as, for example, mobile phones, computers, tablets, industrial wireless sensors (for example, microphones, carbon dioxide sensors, pressure sensors, humidity sensors, thermometers, motion sensors, accelerometers, laser scanners, fluid level sensors, inventory sensors, electric voltage/current meters, actuators, etc.), video surveillance/monitoring devices (for example, carrieras, video carrieras, etc.), wearable devices (for example, a smart watch), relaxed-IoT devices. In some embodiments, the UE 1500 may be a RedCap UE or NR-Light UE.

The UE 1500 may include processors 1504, RF interface circuitry 1508, memory/storage 1512, user interface 1516, sensors 1520, driver circuitry 1522, power management integrated circuit (PMIC) 1524, antenna structure 1526, and battery 1528. The components of the UE 1500 may be implemented as integrated circuits (ICs), portions thereof, discrete electronic devices, or other modules, logic, hardware, software, firmware, or a combination thereof. The block diagram of FIG. 15 is intended to show a high-level view of some of the components of the UE 1500. However, some of the components shown may be omitted, additional components may be present, and different arrangement of the components shown may occur in other implementations.

The components of the UE 1500 may be coupled with various other components over one or more interconnects 1532, which may represent any type of interface, input/output, bus (local, system, or expansion), transmission line, trace, optical connection, etc. that allows various circuit components (on common or different chips or chipsets) to interact with one another.

The processors 1504 may include processor circuitry such as, for example, baseband processor circuitry (BB) 1504A, central processor unit circuitry (CPU) 1504B, and graphics processor unit circuitry (GPU) 1504C. The processors 1504 may include any type of circuitry or processor circuitry that executes or otherwise operates computer-executable instructions, such as program code, software modules, or functional processes from memory/storage 1512 to cause the UE 1500 to perform operations as described herein.

In some embodiments, the baseband processor circuitry 1504A may access a communication protocol stack 1536 in the memory/storage 1512 to communicate over a 3GPP compatible network In general, the baseband processor circuitry 1504A may access the communication protocol stack to: perform user plane functions at a PHY layer, MAC layer, RLC layer, PDCP layer, SDAP layer, and PDU layer; and perform control plane functions at a PHY layer, MAC layer, RLC layer, PDCP layer, RRC layer, and a non-access stratum layer. In some embodiments, the PHY layer operations may additionally/alternatively be performed by the components of the RF interface circuitry 1508.

The baseband processor circuitry 1504A may generate or process baseband signals or waveforms that carry information in 3GPP-compatible networks. In some embodiments, the waveforms for NR may be based cyclic prefix OFDM (CP-OFDM) in the uplink or downlink, and discrete Fourier transform spread OFDM (DFT-S-OFDM) in the uplink.

The memory/storage 1512 may include one or more non-transitory, computer-readable media that includes instructions (for example, communication protocol stack 1536) that may be executed by one or more of the processors 1504 to cause the UE 1500 to perform various operations described herein. The memory/storage 1512 include any type of volatile or non-volatile memory that may be distributed throughout the UE 1500. In some embodiments, some of the memory/storage 1512 may be located on the processors 1504 themselves (for example, L1 and L2 cache), while other memory/storage 1512 is external to the processors 1504 but accessible thereto via a memory interface. The memory/storage 1512 may include any suitable volatile or non-volatile memory such as, but not limited to, dynamic random access memory (DRAM), static random access memory (SRAM), erasable programmable read only memory (EPROM), electrically erasable programmable read only memory (EEPROM). Flash memory, solid-state memory, or any other type of memory device technology.

The RF interface circuitry 1508 may include transceiver circuitry and radio frequency front module (RFEM) that allows the UE 1500 to communicate with other devices over a radio access network. The RF interface circuitry 1508 may include various elements arranged in transmit or receive paths. These elements may include, for example, switches, mixers, amplifiers, filters, synthesizer circuitry, control circuitry, etc.

In the receive path, the RFEM may receive a radiated signal from an air interface via antenna structure 1526 and proceed to filter and amplify (with a low-noise amplifier) the signal. The signal may be provided to a receiver of the transceiver that down-converts the RF signal into a baseband signal that is provided to the baseband processor of the processors 1504.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antenna 1526.

In various embodiments, the RF interface circuitry 1508 may be configured to transmit/receive signals in a manner compatible with NR access technologies.

The antenna 1526 may include antenna elements to convert electrical signals into radio waves to travel through the air and to convert received radio waves into electrical signals. The antenna elements may be arranged into one or more antenna panels. The antenna 1526 may have antenna panels that are omnidirectional, directional, or a combination thereof to enable beamforming and multiple input, multiple output communications. The antenna 1526 may include microstrip antennas, printed antennas fabricated on the surface of one or more printed circuit boards, patch antennas, phased array antennas, etc. The antenna 1526 may have one or more panels designed for specific frequency bands including bands in FR1 or FR2.

The user interface circuitry 1516 includes various input/output (I/O) devices designed to enable user interaction with the UE 1500. The user interface 1516 includes input device circuitry and output device circuitry. Input device circuitry includes any physical or virtual means for accepting an input including, inter alia, one or more physical or virtual buttons (for example, a reset button), a physical keyboard, keypad, mouse, touchpad, touchscreen, microphones, scanner, headset, or the like. The output device circuitry includes any physical or virtual means for showing information or otherwise conveying information, such as sensor readings, actuator position(s), or other like information. Output device circuitry may include any number or combinations of audio or visual display, including, inter alia, one or more simple visual outputs/indicators (for example, binary status indicators such as light emitting diodes "LEDs" and multi-character visual outputs, or more complex outputs such as display devices or touchscreens (for example, liquid crystal displays (LCDs), LED displays, quantum dot displays, projectors, etc.), with the output of characters, graphics, multimedia objects, and the like being generated or produced from the operation of the UE 1500.

The sensors 1520 may include devices, modules, or subsystems whose purpose is to detect events or changes in its environment and send the information (sensor data) about the detected events to some other device, module, subsystem, etc. Examples of such sensors include, inter alia, inertia measurement units comprising accelerometers, gyroscopes, or magnetometers; microelectromechanical systems or nanoelectromechanical systems comprising 3-axis accelerometers, 3-axis gyroscopes, or magnetometers; level sensors; flow sensors; temperature sensors (for example, thermistors); pressure sensors; barometric pressure sensors; gravimeters; altimeters; image capture devices (for example, carrieras or lensless apertures); light detection and ranging sensors; proximity sensors (for example, infrared radiation detector and the like); depth sensors; ambient light sensors; ultrasonic transceivers; microphones or other like audio capture devices; etc.

The driver circuitry 1522 may include software and hardware elements that operate to control particular devices that are embedded in the UE 1500, attached to the UE 1500, or otherwise communicatively coupled with the UE 1500. The driver circuitry 1522 may include individual drivers allowing other components to interact with or control various input/output (I/O) devices that may be present within, or connected to, the UE 1500. For example, driver circuitry 1522 may include a display driver to control and allow access to a display device, a touchscreen driver to control and allow access to a touchscreen interface, sensor drivers to obtain sensor readings of sensor circuitry 1520 and control and allow access to sensor circuitry 1520, drivers to obtain actuator positions of electro-mechanic components or control and allow access to the electro-mechanic components, a carriera driver to control and allow access to an embedded image capture device, audio drivers to control and allow access to one or more audio devices.

The PMIC 1524 may manage power provided to various components of the UE 1500. In particular, with respect to the processors 1504, the PMIC 1524 may control power-source selection, voltage scaling, battery charging, or DC-to-DC conversion.

In some embodiments, the PMIC 1524 may control, or otherwise be part of, various power saving mechanisms of the UE 1500. For example, if the platform UE is in an RRC_Connected state, where it is still connected to the RAN node as it expects to receive traffic shortly, then it may enter a state known as Discontinuous Reception Mode (DRX) after a period of inactivity. During this state, the UE 1500 may power down for brief intervals of time and thus save power. If there is no data traffic activity for an extended period of time, then the UE 1500 may transition off to an RRC_Idle state, where it disconnects from the network and does not perform operations such as channel quality feedback, handover, etc. The UE 1500 goes into a very low power state and it performs paging where again it periodically wakes up to listen to the network and then powers down again. The UE 1500 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 1528 may power the UE 1500, although in some examples the UE 1500 may be mounted deployed in a fixed location, and may have a power supply coupled to an electrical grid. The battery 1528 may be a lithium ion battery, a metal-air battery, such as a zinc-air battery, an aluminum-air battery, a lithium-air battery, and the like. In some implementations, such as in vehicle-based applications, the battery 1528 may be a typical lead-acid automotive battery.

Figure 16:
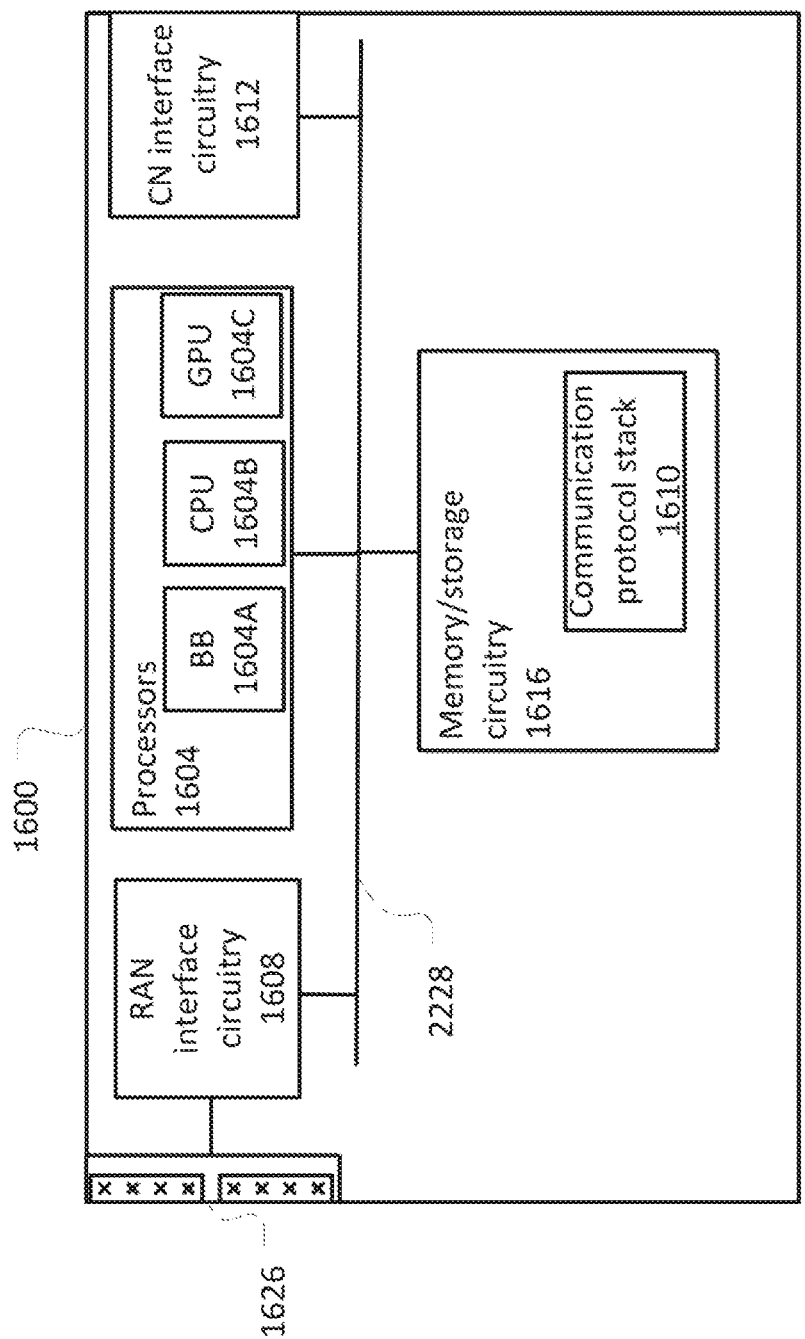
FIG. 16 illustrates an example next generation Node B in accordance with some embodiments.

FIG. 16 illustrates an example gNB 1600 in accordance with some embodiments. The gNB 1600 may include processors 1604, RF interface circuitry 1608, core network (CN) interface circuitry 1612, memory/storage circuitry 1616, and antenna structure 1626.

The components of the gNB 1600 may be coupled with various other components over one or more interconnects 1628.

The processors 1604, RF interface circuitry 1608, memory/storage circuitry 1616 (including communication protocol stack 1610), antenna structure 1626, and interconnects 1628 may be similar to like-named elements shown and described with respect to FIG. 15.

The CN interface circuitry 1612 may provide connectivity to a core network, for example, a 5th Generation Core network (5GC) using a 5GC-compatible network interface protocol such as carrier Ethernet protocols, or some other suitable protocol. Network connectivity may be provided to/from the gNB 1600 via a fiber optic or wireless backhaul. The CN interface circuitry 1612 may include one or more dedicated processors or FPGAs to communicate using one or more of the aforementioned protocols. In some implementations, the CN interface circuitry 1612 may include multiple controllers to provide connectivity to other networks using the same or different protocols.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

For one or more embodiments, at least one of the components set forth in one or more of the preceding figures may be configured to perform one or more operations, techniques, processes, or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

In the following sections, further exemplary embodiments are provided.

Example 1 may include one or more computer-readable media having instructions that, when executed by one or more processors, cause a user equipment (LE) to determine the UE is in a high-speed scenario for a radio access network (RAN), determine a measurement period for an intra-frequency measurement with measurement gap (MG) resource based on a carrier specific scaling factor ($CSSF_{intra}$) for the high-speed scenario, and initiate an intra-frequency measurement to be performed within the measurement period.

Example 2 may include the one or more computer-readable media of example 1, wherein the instructions, when executed by the one or more processors, further cause the UE to identify the high-speed scenario based on an indication from a base station.

Example 3 may include the one or more computer-readable media of example 1, wherein the measurement period is a synchronization signal/physical broadcast channel block (SSB) measurement period, and wherein the intra-frequency measurement is an SSB measurement.

Example 4 may include the one or more computer-readable media of example 1, wherein the instructions, when executed by the one or more processors, further cause the UE to receive an intra-frequency measurement object (MO) to configure the intra-frequency measurement with the MG resource, receive one or more inter-frequency MOs to configure one or more inter-frequency measurements, and utilize the $CSSF_{intra}$ to scale the MG resource to accommodate the one or more inter-frequency measurements.

Example 5 may include the one or more computer-readable media of example 1 wherein the $CSSF_{intra}$ is based on a measurement gap sharing scheme (measGapSharingScheme) parameter.

Example 6 may include a user equipment (UE) comprising one or more antennas to communicate with a base station (BS), and processing circuitry coupled with the one or more antennas, the processing circuitry to determine the UE is connected to the BS in a high speed train mode in frequency range 1 (FR1) carrier aggregation, determine an operation to be performed by the UE on a deactivated secondary component carrier (SCC), determine a period for performance of the operation based on a scaling factor, wherein the scaling factor for the period for a discontinuous reception (DRX) cycle that is less than or equal to 320 milliseconds (ms) is equal to one, and perform the operation.

Example 7 may include the UE of example 6, wherein the scaling factor is equal to one based on a measurement periodicity of the deactivated SCC (measCycleSCell) being less than or equal to a predefined threshold.

Example 8 may include the UE of example 7, wherein the predefined threshold is equal to 320 milliseconds.

Example 9 may include the UE of example 6, wherein the operation is a primary synchronization signal (PSS)/secondary synchronization signal (SSS) detection operation.

Example 10 may include the UE of example 6, wherein the operation is a time index detection operation.

Example 11 may include the UE of example 6, wherein the operation is a measurement operation using an intra-frequency measurement object without gaps.

Example 12 may include a method for operating user equipment (UE) comprising determining the UE is connected to a base station (BS) in high-speed mode in frequency range 1 (FR1) caner aggregation, determining an operation to be performed by the UE on a deactivated secondary component carrier (SCC), determining a period for performance of the operation based on a carrier specific scaling factor ($CSSF_{intra}$), wherein a sample number for layer 1 (L1) filtering for the period is less than five for the operation being a primary synchronization signal (PSS)/secondary synchronization signal (SSS) detection operation and intra-frequency measurements, and wherein the sample number is less than three for the operation being a time index detection operation, and performing the operation.

Example 13 may include the method of example 12, further comprising determining the sample number based on a measurement periodicity of the deactivated SCC (measCycleSCell).

Example 14 may include the method of example 13, wherein the sample number is proportional to the measCycleSCell.

Example 15 may include the method of example 12, further comprising determining the sample number based on a size of a discontinuous reception (DRX) cycle for the UE.

Example 16 may include the method of example 15, wherein the sample number is inversely proportional to the size of the DRX cycle.

Example 17 may include the method of example 12, further comprising determining the sample number based on a value of max(measCycleSCell, DRX cycle) for a DRX cycle that is greater than 320 ms, wherein measCycleSCell is a measurement periodicity of the deactivated SCC, and wherein DRX cycle is a discontinuous reception (DRX) cycle for the UE.

Example 18 may include the method of example 12, further comprising determining the sample number based on a value of max(measCycleSCell), 1.5*DRX cycle) for the DRX cycle that is less than or equal to 320 ms and a scaling factor for the period is equal to 1.5, wherein measCycleSCell is a measurement periodicity of the deactivated SCC, and wherein DRX cycle is a discontinuous reception (DRX) cycle for the UE.

Example 19 may include one or more computer-readable media having instructions that, when executed by one or more processors, cause a user equipment (UE) to determine the UE is connected to a base station (BS) in high-speed mode in carrier aggregation, determine a carrier specific scaling factor ($CSSF_{intra}$) for a measurement period of intra-frequency measurement without measurement gap (MG), determine a measurement period for the UE based on the $CSSF_{intra}$, and configure the measurement period and to share a searcher resource among active serving component carriers (CCs).

Example 20 may include the one or more computer-readable media of example 19, wherein the UE is to determine the $CSSF_{intra}$ to be one for HST primary component carriers (PCCs).

Example 21 may include the one or more computer-readable media of example 19, wherein the UE is to determine the $CSSF_{intra}$ to be equal to a number of HST secondary component carriers (SCCs) for HST SCCs.

Example 22 may include the one or more computer-readable media of example 19, wherein the measurement period is a synchronization signal/physical broadcast channel block (SSB) measurement period.

Example 23 may include a method comprising performance of the operations of any of examples 1-22.

Example 24 may include an apparatus comprising means to perform one or more elements of any of examples 1-22.

Example 25 may include a signal as described in or related to any of examples 1-22, or portions or parts thereof.

Example 26 may include a datagram, information element, packet, frame, segment, PDU, or message as described in or related to any of examples 1-22, or portions or parts thereof, or otherwise described in the present disclosure.

Example 27 may include a signal encoded with data as described in or related to any of examples 1-22, or portions or parts thereof, or otherwise described in the present disclosure.

Example 28 may include a signal encoded with a datagram, IE, packet, frame, segment, PDU, or message as described in or related to any of examples 1-22, or portions or parts thereof, or otherwise described in the present disclosure.

Example 29 may include an electromagnetic signal carrying computer-readable instructions, wherein execution of the computer-readable instructions by one or more processors is to cause the one or more processors to perform the method, techniques, or process as described in or related to any of examples 1-22, or portions thereof.

Example 30 may include a signal in a wireless network as shown and described herein.

Example 31 may include a method of communicating in a wireless network as shown and described herein.

Example 32 may include a system for providing wireless communication as shown and described herein.

Example 33 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. One or more non-transitory, computer-readable media having instructions that, when executed, cause processing circuitry to:
    perform, based on a high-speed mode with a radio access network (RAN) an intra-frequency measurement within a measurement period for an intra-frequency measurement with measurement gap (MG) resource, wherein the measurement period for a discontinuous reception (DRX) cycle greater than 160 milliseconds and less than or equal to 320 milliseconds is based on the equation max (200 ms, ceil (M2×4))×max (MGRP, DRX cycle))×$CSSF_{intra}$ for the high-speed mode, wherein ms is milliseconds, MGRP is a measurement gap repetition period, M2 equals 1.5 if a synchronization signal/physical broadcast channel-based measurement time configuration (SMTC) periodicity is greater than 40 milliseconds and otherwise equals 1, and $CSSF_{intra}$ is a cell specific scaling factor for intra-frequency measurement.

2. The one or more non-transitory, computer-readable media of claim 1, wherein the instructions, when executed, further cause the processing circuitry to:
    identify the high-speed mode based on an indication from a base station.

3. The one or more non-transitory, computer-readable media of claim 1, wherein the measurement period is a synchronization signal/physical broadcast channel block (SSB) measurement period, and wherein the intra-frequency measurement is an SSB measurement.

4. The one or more non-transitory, computer-readable media of claim 1, wherein the instructions, when executed, further cause the processing circuitry to:
    receive an intra-frequency measurement object (MO) to configure the intra-frequency measurement with MG resource;
    receive one or more inter-frequency MOs to configure one or more inter-frequency measurements; and
    utilize the $CSSF_{intra}$ to scale an MG resource of the intra-frequency measurement with MG resource to accommodate the one or more inter-frequency measurements.

5. The one or more non-transitory, computer-readable media of claim 1, wherein the $CSSF_{intra}$ is based on a measurement gap sharing scheme (measGapSharingScheme) parameter.

6. The one or more non-transitory, computer-readable media of claim 1, wherein the measurement period is determined based further on a discontinuous reception (DRX) cycle period.

7. The one or more non-transitory, computer-readable media of claim 6, wherein the measurement period is determined to be a first length based on the DRX cycle period being less than 160 milliseconds (ms), a second length based on the DRX cycle period being between 160 ms and 320 ms, and a third length based on the DRX cycle period being greater than 320 ms.

8. The one or more non-transitory, computer-readable media of claim 1, wherein the $CSSF_{intra}$ is based on a number of primary component carriers (PCCs) or a number of secondary component carriers (SCCs).

9. A method comprising:
    generating an indication that a high-speed mode is to be implemented for a radio access network (RAN); and
    determining a measurement period for an intra-frequency measurement with measurement gap (MG) resource, wherein the measurement period for a discontinuous reception (DRX) cycle greater than 160 milliseconds and less than or equal to 320 milliseconds is based on the equation max (200 ms, ceil (M2×4)×max (MGRP, DRX cycle))×$CSSF_{intra}$ for the high speed mode, wherein ms is milliseconds, MGRP is a measurement gap repetition period, M2 equals 1.5 if a synchronization signal/physical broadcast channel-based measurement time configuration (SMTC) periodicity is greater than 40 milliseconds and otherwise equals 1, and $CSSF_{intra}$ is a cell specific scaling factor for intra-frequency measurement.

10. The method of claim 9, wherein the $CSSF_{intra}$ is equal to one based on a measurement periodicity of a deactivated SCC (measCycleSCell) being less than or equal to a predefined threshold.

11. The method of claim 10, wherein the predefined threshold is equal to 320 milliseconds.

12. The method of claim 9, further comprising:
    generating configuration information for configuration of a user equipment (UE) to perform the intra-frequency measurement with MG resource, the configuration information including an indication of a MGRP value or an SMTC period value.

13. The method of claim 9, further comprising:
    generating an intra-frequency measurement object to be utilized by a user equipment (UE) for performance of the intra-frequency measurement with MG resource.

14. The method of claim 9, further comprising:
    initiating an internal timer based at least in part on the determined measurement period.

15. A method comprising:
    determining that a high-speed mode is to be implemented in frequency range 1 (FR1) carrier aggregation;
    determining an operation to be performed on a deactivated secondary component carrier (SCC);
    determining a period for performance of the operation based on a carrier specific scaling factor ($CSSF_{intra}$), wherein a sample number for layer 1 (L1) filtering for the period is less than five for the operation being a primary synchronization signal (PSS)/secondary synchronization signal (SSS) detection operation and intra-frequency measurements, and wherein the sample number is less than three for the operation being a time index detection operation; and performing the operation.

16. The method of claim 15, further comprising determining the sample number based on a measurement periodicity of the deactivated SCC (measCycleSCell).

17. The method of claim 16, wherein the sample number is proportional to the measCycleSCell.

18. The method of claim 15, further comprising determining the sample number based on a size of a discontinuous reception (DRX) cycle.

19. The method of claim 18, wherein the sample number is inversely proportional to the size of the DRX cycle.

20. The method of claim 15, further comprising determining the sample number based on a value of max (measCycleSCell, DRX cycle) for a DRX cycle that is greater than 320 milliseconds, wherein measCycleSCell is a measurement periodicity of the deactivated SCC, and wherein DRX cycle is a discontinuous reception (DRX) cycle.

* * * * *